(12) United States Patent
Morita

(10) Patent No.: US 7,647,602 B2
(45) Date of Patent: Jan. 12, 2010

(54) DISC DEVICE

(75) Inventor: Masaho Morita, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 368 days.

(21) Appl. No.: 11/579,936

(22) PCT Filed: May 10, 2005

(86) PCT No.: PCT/JP2005/008478

§ 371 (c)(1),
(2), (4) Date: Jul. 20, 2007

(87) PCT Pub. No.: WO2005/109423

PCT Pub. Date: Nov. 17, 2005

(65) Prior Publication Data

US 2008/0282280 A1    Nov. 13, 2008

(30) Foreign Application Priority Data

May 10, 2004    (JP)    ............................. 2004-140501

(51) Int. Cl.
*G11B 23/03*    (2006.01)
(52) U.S. Cl. .................................................... 720/728
(58) Field of Classification Search ................ 720/728, 720/645, 725, 739, 720, 652, 726; 360/133
See application file for complete search history.

(56) References Cited

U.S. PATENT DOCUMENTS 4,803,678 A * 2/1989 Tanaka et al. ............... 720/728

(Continued)

FOREIGN PATENT DOCUMENTS

JP    2-126471 A    5/1990

(Continued)

OTHER PUBLICATIONS

International Preliminary Report on Patentability dated Nov. 14, 2006 from the corresponding PCT/JP2005/008478 in English.

(Continued)

*Primary Examiner*—Allen T Cao
(74) *Attorney, Agent, or Firm*—Katten Muchin Rosenman LLP

(57) ABSTRACT

A disc device includes: a casing including: a casing body that has a housing section of a disc 4 and houses a device body including a drive unit for rotating the disc 4; and a cover section rotatably supported on the casing body for closing the housing section. The casing includes: a rotation stop mechanism 5 for stopping rotation of the disc 4 when the cover section is opened. The rotation stop mechanism 5 includes a lever 6 rotatably supported on the casing body and having a contact section 631 contacting with the disc 4 when the cover section is opened; a biasing unit 7 provided on the lever 6 for biasing the contact section 631 toward an edge face of the disc 4; and a first releasing unit 13B provided in a protruding state on the cover section, the releasing unit 13B contacting with the lever 6 to rotate the lever 6 for releasing contact between the contact section 631 and the disc 4 when the cover section is closed. The contact section 631 has a contact face 632 inclined against the rotational tangent direction of the disc 4.

6 Claims, 16 Drawing Sheets

U.S. PATENT DOCUMENTS

| | | | | |
|---|---|---|---|---|
| 5,995,482 | A * | 11/1999 | Iwazawa | 720/728 |
| 6,181,664 | B1 * | 1/2001 | Kano et al. | 720/645 |
| 7,032,234 | B2 * | 4/2006 | Shimazaki et al. | 720/728 |
| 7,356,825 | B2 * | 4/2008 | Makisaka et al. | 720/626 |
| 2002/0191532 | A1 * | 12/2002 | Bae et al. | 369/291 |
| 2004/0062190 | A1 * | 4/2004 | Imai | 369/291 |
| 2005/0086671 | A1 * | 4/2005 | Makisaka et al. | 720/617 |
| 2005/0216925 | A1 * | 9/2005 | Fujisawa et al. | 720/616 |
| 2009/0125933 | A1 * | 5/2009 | Takizawa et al. | 720/728 |
| 2009/0178064 | A1 * | 7/2009 | Wada | 720/601 |

FOREIGN PATENT DOCUMENTS

| | | |
|---|---|---|
| JP | 9-259519 A | 10/1997 |
| JP | 10-079162 | 3/1998 |
| JP | 2003-109295 | 4/2003 |
| JP | 2003-228905 A | 8/2003 |

OTHER PUBLICATIONS

Notification of Reason(s) for Refusal dated Jun. 3, 2008, from corresponding Japanese Application No. 2004-140501.

Microfilm of the specification and drawings annexed to the request of Japanese Utility Model Application No. 186413/1985 (Laid-open No. 94456/1987) (Sanyo Electric Co., Ltd.), Jun. 16, 1987. Mentioned in International Search Report dated Aug. 23, 2005; PCT/ISA/237 and the translation thereof are attached instead of the abstract of JP S62-94456 U; Figure 3.

* cited by examiner

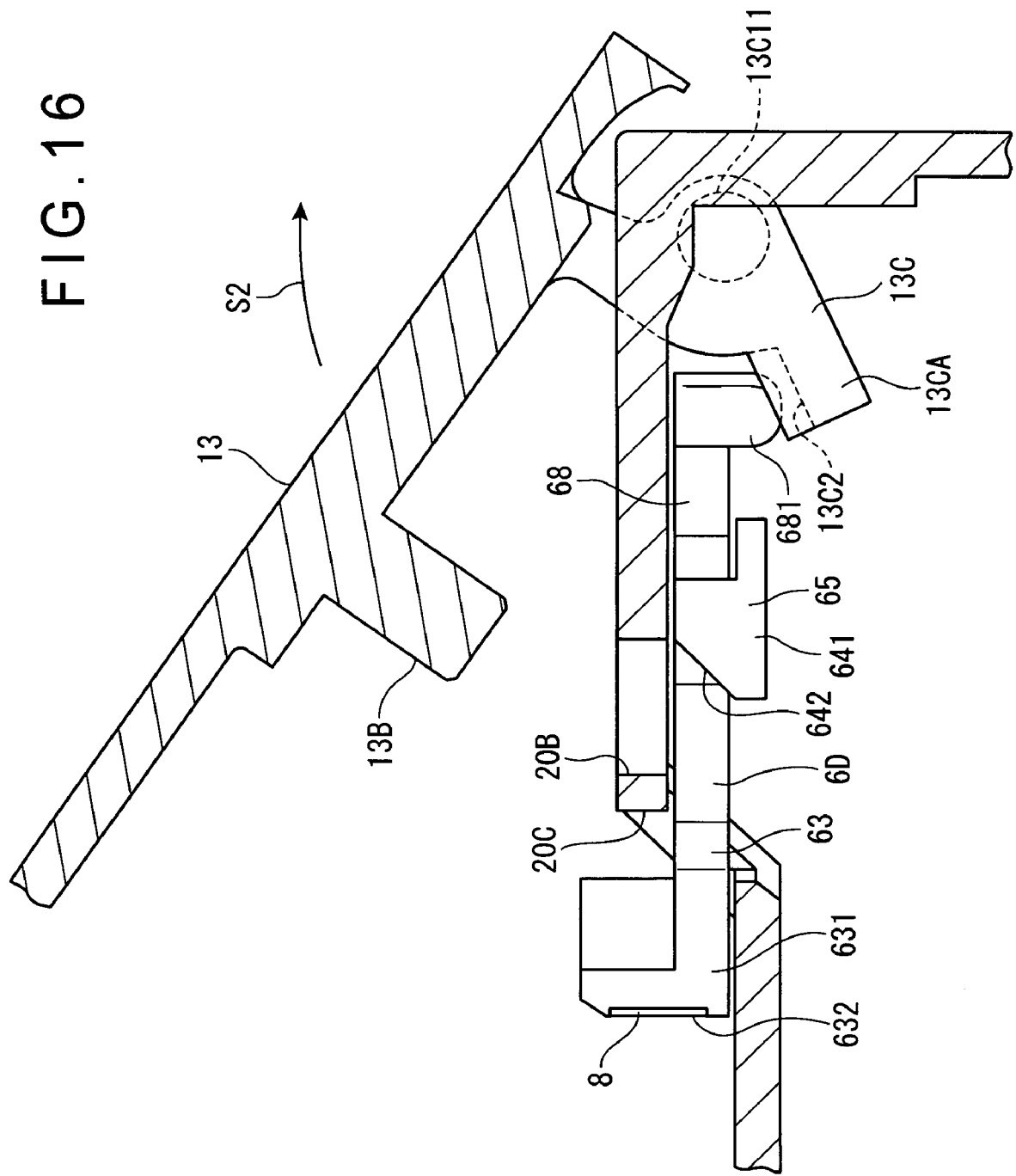

DISC DEVICE

This application is a National Phase Application of International Application No. PCT/JP2005/008478, filed May 10, 2005, which claims the benefit under 35 U.S.C. 119 (a-e) of Japanese Application No. 2004-140501 filed May 10, 2004, which is herein incorporated by reference.

TECHNICAL FIELD

The present invention relates to a disc device including a casing having a housing section for housing therein a disc so that the disc can rotate in the peripheral direction and a cover section for covering an opening for housing the disc in the housing section.

BACKGROUND ART

There has been known an optical disc device for reproducing information recorded in an optical disc such as a CD (compact disc) or a DVD (digital versatile disc), or an optical disc device for recording/reproducing information in and from an optical disc. In the optical disc devices as described above, an optical disc housed in the housing section is rotated by a driving unit such as a spindle motor provided in the housing section, a light spot is irradiated onto an information recording surface of the rotating optical disc from an optical pick-up, and information is recorded and/or reproduced by detecting reflected light.

As the optical disc devices as described above, there have been the loading type of optical disc devices having the structure in which an optical disc is placed in a concave section on a disc tray as a housing section and this disc tray is loaded to house the optical disc inside the casing, and the cover open/close type of optical disc devices in which the housing section is covered with a cover section and an optical disc is housed inside the casing by opening or closing this cover section. Of these two types, in the cover open/close type of optical disc device, when the cover section is opened during rotation of the optical disc, sometimes the rotating optical disc springs out from the housing section, causing the optical disc to be broken, or rotation of the optical disc is forcefully stopped by a user, causing a circuit provided inside the optical disc device to be broken.

To solve the problem as described above, there has been known an optical disc device in which rotation of the optical disc is automatically stopped when the cover section is opened during rotation of the optical disc. Among such type of optical disc devices, there has been known the one in which, when the cover section (cover) is opened, a lever is moved via a gear provided on the cover section and via a gear provided in the optical disc device (disc reproduction unit), the movement of the lever causing a brake arm to contact with an outer peripheral edge face of the optical disc for braking rotation of the optical disc (see, for instance, Patent Document 1). Also, there has been known an optical disc device in which, when the cover section (upper cover) is opened, a brake lever slides forward and backward, causing a brake pad to be pressed to an edge face of the optical disc for braking rotation of the optical disc (see, for instance, Patent Document 2). In the optical disc devices having the structures as described above, even when the cover section is opened during rotation of the optical disc, rotation of the optical disc is braked, so that damages of the disc or the circuit can be prevented.

[Patent Document 1] Japanese Patent Laid-Open Publication No. HEI 2-126471
[Patent Document 2] Japanese Patent Laid-Open Publication No. HEI 10-79162

DISCLOSURE OF THE INVENTION

Problems to be Solved by the Invention

With the optical disc device as described in Document 1, however, a force involved in opening of the cover section is delivered to the brake arm via a number of gears for braking rotation of the optical disc, so that the structure is disadvantageously complicated. Further in the case of the optical disc device described in Document 2, the structure is simplified, but as the brake pad is slid and pressed to the edge face of the optical disc in the direction substantially orthogonal to a tangent line for the edge face, so that a force may be loaded to the brake pad in irregular directions when rotation of the optical disc is braked. Because of this feature, an acting direction of the force loaded to the brake pad, etc. is dispersed during braking operation of rotation of the optical disc, which causes loss of control. In addition, an unexpected load may be loaded to components of the devices, which causes damages on the components as well as stability in braking operation.

An object of the present invention is to provide a disc device with a simple structure capable of controlling an acting direction of force acting for braking.

Means for Solving the Problems

The disc device according to an aspect of the present invention includes a casing including: a casing body that has a housing section for housing a disc and houses a device body including a drive unit for rotating the disc; and a cover section rotatably supported on the casing body for closing an opening for housing the disc in the housing section. A rotation stop mechanism for stopping rotation of the disc when the cover section is opened is provided in the casing. The rotation stop mechanism includes: a lever that is rotatably supported on the casing body and has a contact section contacting an edge face of the disc set therein when the cover section is opened; a biasing unit provided on the lever for biasing the contact section in a direction toward the edge face of the optical disc; and a first releasing unit provided in a protruding state on the cover section, the first releasing unit contacting with the lever to rotate the lever in a direction away from the edge face of the disc when the cover section is closed for releasing contact between the contact section and the edge face of the disc. The contact section has a contact face extending in a direction inclined against a rotational tangent direction of the disc.

The disc as used herein includes optical discs such as a CD, a CD-ROM, a CD-R, a CD-RW, a DVD-ROM, a DVD-R, a DVD-RW, a DVD+R, a DVD+RW, and DVD-RAM; an MO disc (magnetic optical disc), a magnetic disc and the like.

With the present invention, when the cover section is opened, the lever rotates due to the biasing force of the biasing unit and the contact section of the lever contacts with the edge face of the disc, so that the rotating disc can be braked in response to opening of the cover section is opened. Further, when the cover section is closed, the lever is rotated by the first releasing unit formed on the cover section against the biasing force of the biasing unit and the contact section of the lever moves away from the edge face of the disc, so that the disc is protected against interference to its rotation. Thus, rotation of the disc can be controlled according to an opening or closing operation of the cover section.

Further, the rotation stop mechanism includes the lever, the biasing unit, and the first releasing unit provided on the cover section as described above, so that a structure of the rotation stop mechanism acting of the disc in association with opening movement of the cover section can be simplified.

The contact section for controlling rotation of the disc contacts with the edge face of the disc in association due to rotation of the lever, so that the contact section moves in the rotating direction of the lever when rotation of the disc is braked. Because of this structure, a direction of the force acting on the lever in braking can be set in the same direction as the acting direction of the biasing force of the biasing unit or in the direction reverse to the acting direction of the biasing force of the biasing unit. Therefore, a force acted on the lever can be controlled with the biasing force of the biasing unit.

With the present invention, the contact surface of the contact section contacted with the edge face of the disc is inclined against the rotational tangent direction of the disc, so that, even when there is variation in diameters of discs set thereon, the edge face of the discs can securely be contacted with the contact surface to stop rotation of the disc. Any portion of the inclined contact surface contacts the edge face of the disc, and therefore as compared with a case where the contact surface is parallel to the rotational tangent direction of, size of the contact section can be reduced. As a result, the lever size can be reduced, and the rotation stop mechanism can be downsized.

Further, the contact section of the lever contacts with the edge face of the disc as the lever rotates, so that an angle between the edge face of the disc and the contact surface can easily be adjusted.

In the disc device according to the present invention, the lever preferably rotates in the same direction as the rotating direction of the disc to make the contact section contact the edge face of the disc.

With the present invention, the rotating direction of the lever in a braking operation of the rotation of the disc is the same as the rotating direction of the disc. Because of this feature, when the contact section of the lever contacts with the rotating disc, the lever receives a force (force component) acting for rotation in the direction reverse to the rotation direction of the lever in the braking operation of the disc due to the rotating disc, but the force (force component) can be suppressed by an biasing force generated by the biasing unit provided on the lever. Namely, the force (force component) acting for rotating the lever away from the disc during the braking operation of the disc can be controlled by the biasing force of the biasing unit. Therefore, when braking a disc, the contact section can securely contact with the edge face of the disc, and also a pressing force for pressing the contact section to the edge face of the disc can be adjusted by controlling the biasing force of the biasing section.

In the disc device according to the present invention, the biasing unit is preferably a spring member attached to the casing body.

As the spring member, various types of springs including a compression spring, an extension spring, a plate spring, and a torsion spring may be employed.

With the present invention, a structure of the biasing unit for acting the biasing force for rotating the lever can be simplified, and as a result, the disc device with the rotation stop mechanism can be produced with low cost. Further, when any of a compression spring, an extension spring, or a plate spring is used, the rotation stop mechanism for a disc as described above can easily be assembled, and when a torsion spring is employed, further space saving can be achieved with the disc device according to the present invention.

Alternatively, in the disc device according to the present invention, the biasing unit is preferably a magnetic member for attracting or repelling the lever with magnetism.

With the present invention the biasing force for rotating the lever is generated by the magnetic member, when the cover section is opened to rotate the lever and the contact section contacts the edge face of the disc, the strongest biasing force can be loaded to the lever. Therefore, when the cover section is opened, a force for contacting the contact section to the edge face of the disc can be strengthened, so that rotation of the disc can securely be braked.

When the cover section is closed, the biasing force acting on the lever is minimized. With the disc device as described above, since the cover is opened when the disc is set in the housing section, or when a disc is taken out from the housing section, so that a frequency of the closed state of the cover section is higher than that of the opened state. Therefore, a load to the lever can be reduced in the closed state of the cover section, so that damages to the lever can be prevented.

With the disc device according to the present invention, the lever preferably has an inclined surface contacting with the first releasing unit and inclined against the moving direction of the first releasing unit.

With the present invention, the first releasing unit formed on the cover section contacts with the inclined surface formed on the lever and moves along the inclined surface, so that the lever can be rotated at a speed corresponding to an opening speed of the cover section to make the contact section of the lever contact the edge face of the disc. Thus, in association with an opening movement of the cover section, the first releasing unit slides along the inclined surface, so that the lever rotates slowly with the biasing force of the biasing unit in response to opening of the cover section, and the contact section of the lever contacts the edge face of the disc. Therefore the disc can be braked according to the opening state of the cover section.

In the disc device according to the present invention, the cover section preferably has a second releasing unit for contacting the lever in the state where the cover section is substantially fully opened and rotating the lever in a direction away from the edge face of the disc.

With the present invention, in the state where the cover section is substantially fully opened, the second releasing unit rotates the lever contacting the edge face of the disc to move the contact section of the lever away from the edge face of the disc, so that the disc can easily be taken out. Further, because of this feature, an unnecessary load can be prevented from being applied to the lever when the disc is taken out.

BRIEF DESCRIPTION OF DRAWINGS

FIG. 16 is a side view showing the cover section and the lever in the embodiment with the cover section half opened.

EXPLANATION OF CODES

1: entertainment device (disc device)
4: optical disc (disc)
5, 5A, 5B, 5C, 5D: rotation stop mechanism
6, 6A, 6B, 6C, 6D: lever
7: coil spring (biasing unit)
7A: plate spring (biasing unit)
7B: torsion coil spring (biasing unit)
10: entertainment device casing (casing)
13: cover section
13B: projection (first releasing unit)
13C: hinge (second releasing unit)
14: casing body (upper case body)
20: disc housing section (housing section)
91: magnetic member (biasing unit)
631: contact section
642: face (inclined face)

BEST MODE FOR CARRYING OUT THE INVENTION

1. First Embodiment

A first embodiment of the present invention will be described below with reference to the related drawings.

Figure 1:
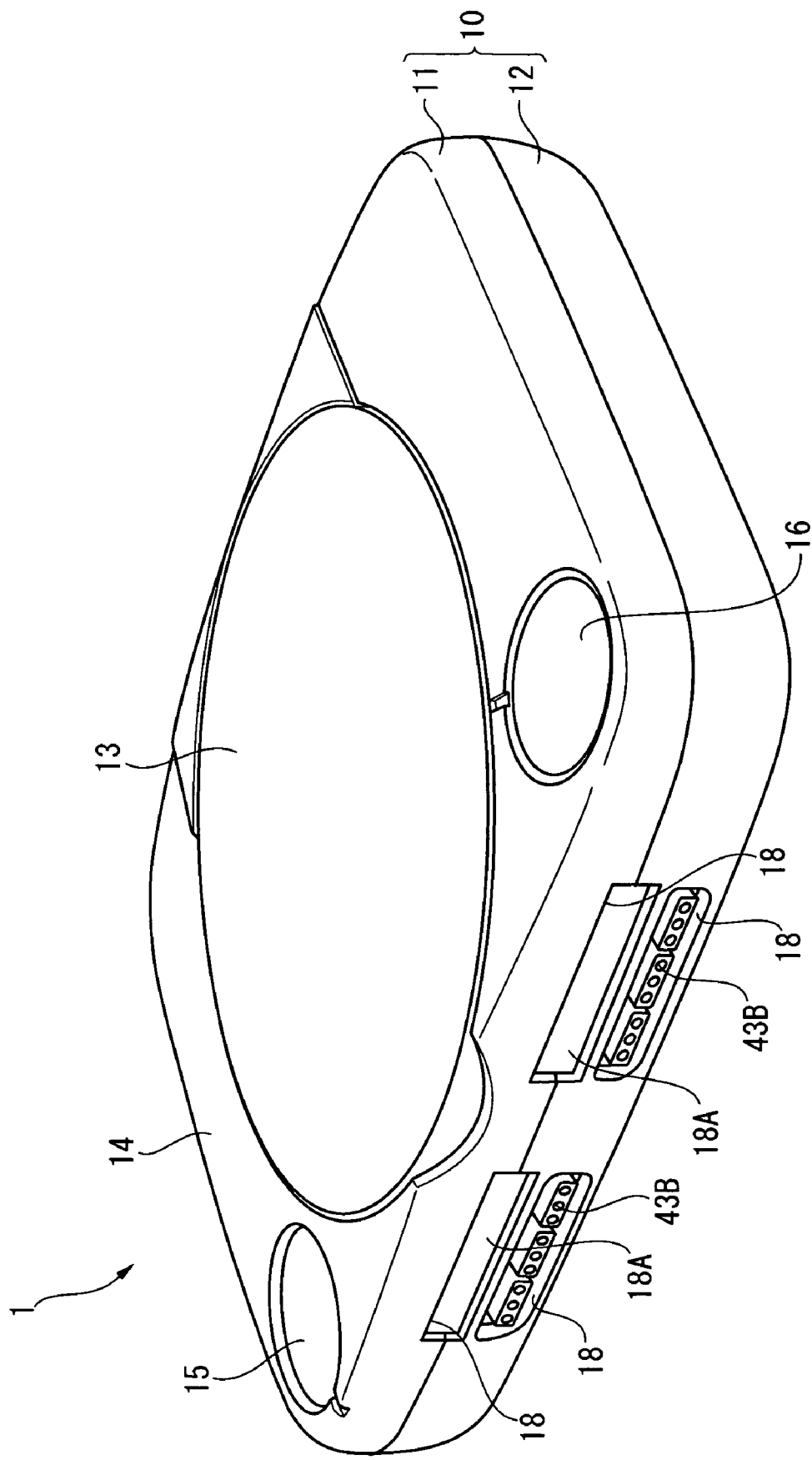
FIG. 1 is a general perspective view showing an entertainment device according to a first embodiment of the present invention.
Figure 2:
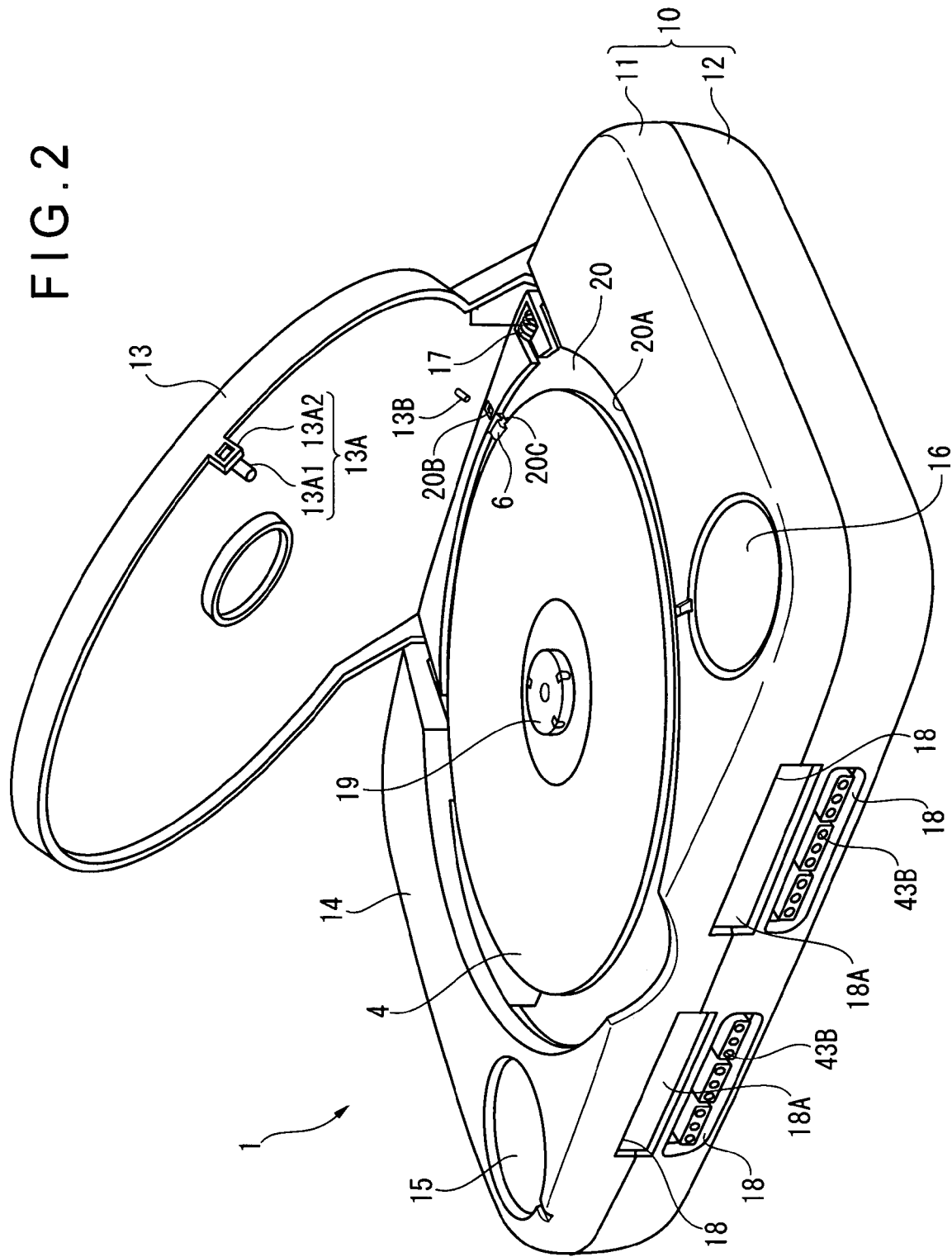
FIG. 2 is a general perspective view showing the entertainment device according to the embodiment with the cover section opened from the state shown in FIG. 1.

FIG. 1 is a general perspective view showing an entertainment device 1 as a disc device according to a first embodiment of the present invention. FIG. 2 is a perspective view showing the entertainment device 1 with the cover section opened from the state shown in FIG. 1.

The entertainment device 1 reads out a game program or the like recorded in an optical disc or the like and runs the game program according to an instruction from a controller (not shown) operated by a user (a game player). This entertainment device 1 is electrically connected to a television receiver (not shown) or the like, and outputs image information and audio information based on a result of processing with the game program to the television receiver.

In addition, the entertainment device 1 can reproduce images and audio information from a CD or a DVD with the images and audio information having been recorded therein, and also can record information in the optical disc according to a type of the optical disc.

Running the game is defined mainly as control over a progress of a game or output of image and audio information.

As shown in FIG. 1 and FIG. 2, the entertainment device 1 includes a device body having electronic parts and the like, and an entertainment device casing 10 (hereinafter, referred to as a casing) as an electronic device casing for housing the device body therein.

The casing 10 is made of a synthetic resin such as ABS resin, which includes an upper case 11 and a lower case 12 each for housing the device body and has a rectangular shape in plan view.

The upper case 11 covers the device body from the upper side and includes an upper case body 14 as a casing body for the upper case 11 and a cover section 13 formed substantially at the center of the upper case body 14 and having a substantially circular shape in plan view.

Provided substantially at the center of the upper case body 14 is an optical disc housing section 20 having a substantially circular shape in plan view with a substantially concaved cross section.

The optical disc housing section 20 has an opening opened upward for housing an optical disc 4 such as a CD or a DVD, and the cover section 13 covers this opening 20A.

Provided substantially at the center of the optical disc housing section 20 is a chucking member 19 for holding the optical disc 4. The chucking member 19 is rotatably supported by a spindle motor (not shown) provided on the device body, and the optical disc 4 is rotated by this spindle motor.

Exposed on the optical disc housing section 20 is a pick-up section (not shown) having an optical head for reading information recorded in the optical disc 4 held by the chucking member 19. This pick-up section is provided in the device body and is electrically connected to a circuit board (not shown) for controlling operations of the device body, and the information read by the pick-up section is output to the circuit board, and is processed by the circuit board.

Further, two openings 20B, 20C each penetrating the upper case body 14 are formed in the far side of the optical disc housing section 20 in FIG. 2.

Two openings with the optical disc housing section 20 interposed therebetween are formed on a top surface of the upper case body 14, and buttons 15 and 16 are exposed from the openings respectively. Of these two buttons, the button 15 positioned in the left side of the optical disc housing section 20 in FIG. 1 and FIG. 2 is a power button 15 operated when turning ON or OFF the power for the entertainment device, while the button 16 positioned in the right side is an open/close button 16 with a hooking member (not shown) incorporated therein that is advanced to/retracted from the cover section 13 for opening or closing the cover section 13.

The cover section 13 is attached to the upper case body 14 with an edge thereof rotatable, and as shown in FIG. 2, a coil spring 17 wound around the rotary shaft of the cover section 13 is provided between the cover section 13 and the upper case body 14, so that the cover section 13 is opened or closed by the biasing force of this coil spring 17. This cover section 13 has a substantially circular shape in plan view corresponding to the optical disc housing section 20 formed in the upper case body 14. On a surface of this cover section 13 opposite to the optical disc housing section 20, an engagement 13A engaging with the hooking member (described above) is provided on the outer circumference of the surface, and a projection 13B as a first releasing unit projecting in an out-of-plane direction is formed.

The engagement 13A includes a projection 13A1 projecting toward the optical disc housing section 20 and a projecting section 13A2 provided on a side closer to an outer edge of the cover section 13 relative to the projection 13A1.

The projection 13A1 is inserted into an opening (not shown) formed in the optical disc housing section 20 when the cover section 13 is closed, so that a tip end of the projection 13A1 contacts a push switch (not shown) provided at the lower side of the opening. This push switch is provided as a detection switch for detecting the open state of the cover section 13. When the tip end of the projection 13A1 contacts with the push switch, OFF state is effected, and when separated therefrom, ON state is effected, thus the open state of the cover section 13 being detected by the device body.

The projecting section 13A2 extends from the outer circumference of the cover section 13 and has an opening formed substantially at the center thereof. A hooking member advanced and retracted by the open/close button 16 described above is engaged in this opening.

The projection 13B is positioned on the far side of the cover section 13 in FIG. 2, off from an area of the optical disc 4 housed in the optical disc housing section 20. More specifically, the projection 13B is formed at a position corresponding to the opening 20B formed in the optical disc housing section 20 when the cover section 13 is closed.

The cover section 13 having the arrangement as described above is opened by the following mechanism.

When the open/close button 16 is pressed in a state where the cover section 13 is closed (state shown in FIG. 1), engagement between an incorporated hooking member (not shown) and the projection 13A1 provided at an edge of the cover section 13 is released, and the cover section 13 is opened by the biasing force of the coil spring 17 (state shown in FIG. 2), so that the optical disc housing section 20 is exposed. The optical disc 4 is set on the chucking member 19 provided substantially at the center of the optical disc housing section 20 through the opening 20A for housing the optical disc in the optical disc housing section 20. Then, when the power button 15 is pressed after the cover section 13 is closed, power for the device body is turned ON, so that contents recorded in the optical disc 4 can be reproduced.

Four openings 18 are provided on the front side of the casing 10 shown in FIGS. 1 and 2. Of these openings, from two openings 18 formed on the upper side memory card connecting sections (not shown) mounted on the circuit board providing controls over operations of the device body are exposed, and from the two openings 18 formed on the lower side, controller connecting sections 43B also mounted on the circuit board are exposed. It is to be noted that the two openings 18 exposing the memory card connecting sections are covered with shutters 18A. The shutters 18A are opened, when a tip end of a memory card (not shown) is pushed into the openings 18, which allows the memory card to connect to the memory card connecting sections.

Although not shown in FIG. 1 and FIG. 2, provided on a face opposite to the side face with the openings 18 of the casing 10 formed thereon are an opening from which a power connector for supplying power from an external power source to the device body via a power source cable is exposed, and another opening from which an image/audio output terminal for outputting various signals such as an image signal and an audio signal recorded in the optical disc to the television receiver is exposed.

Figure 3:
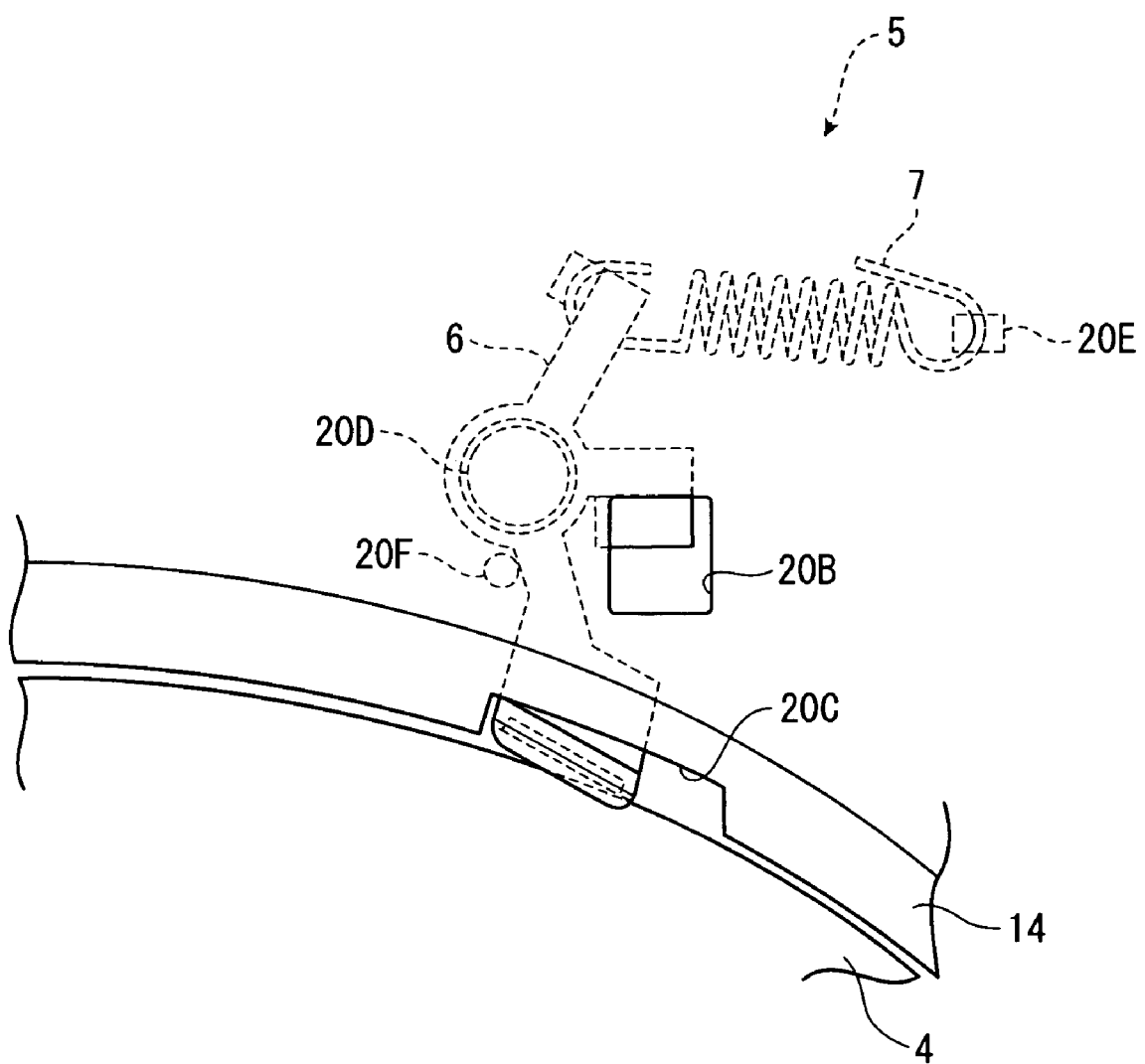
FIG. 3 is a view showing a rotation stop mechanism in the embodiment with the cover section opened.

FIG. 3 is a plan view showing a rotation stop mechanism 5.

As shown in FIG. 3, the rotation stop mechanism 5 is provided on the lower face of the upper case body 14, namely, on a face of the upper case body 14 opposing the lower case 12, the rotation stop mechanism 5 stopping rotation of the optical disc 4 in response to opening of the cover section. This rotation stop mechanism 5 includes a lever 6, a coil spring 7 as a biasing unit, and the projection 13B (described above) formed on the cover section 13.

One end of the coil spring 7 is engaged with a projection 20E projecting from the lower face of the upper case body 14 in an out-of-plane direction in the form of a hook.

One end of the lever 6 contacts with the edge face of the optical disc 4 to stop rotation of the optical disc 4, and is rotatably supported on a projection 20D projecting in an out-of-plane direction from the lower face of the upper case body 14 and having a substantially circular cross section. When the cover section 13 is closed, the lever 6 rotates in the direction away from the edge face of the optical disc 4 as the projection 13B contacts the lever 6 via the opening 20B. When the cover section 13 is opened, the lever 6 rotates in the direction for contacting the edge face of the optical disc 4 with a biasing force by the coil spring 7.

Figure 4:
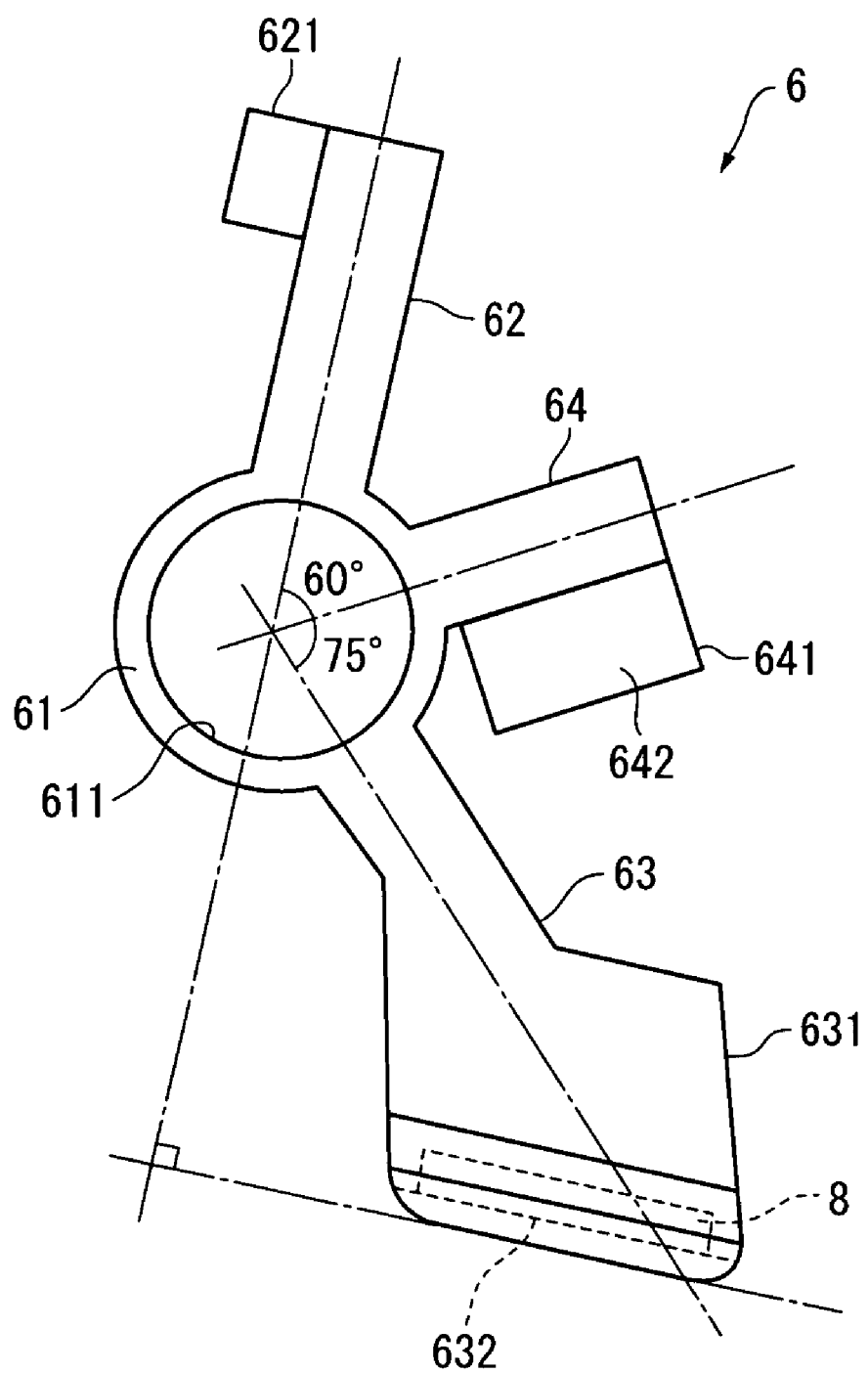
FIG. 4 is a plan view showing a lever in the embodiment.

FIG. 4 is a plan view of the lever 6.

The lever 6 is an integrally molded component made of a synthetic resin, and the lever 6 includes, as shown in FIG. 4, a circular section 61 rotatably supported by the projection 20D, and three arms 62, 63, 64 each radially extending from the peripheral edge of this circular section 61. That is, though described later in detail, the arm 63 having a contact section 631 is formed on one end of the lever 6, and the arm 62 for the coil spring 7 as the biasing unit to be engaged is formed on another end of the lever 6, namely on the end reached from the arm 63 via the circular section 61 as a rotational axis. The arm 64 is formed on still another end of the lever 6, namely, on the end located between these arms 62, 63 via the circular section 61.

An opening 611 having an internal diameter substantially the same as the external diameter of the projection 20D is formed substantially at the center of the circular section 61. The projection 20D is inserted into the opening 611. A hooking member (not shown) is provided on the tip end of the projection 20D so that the supported lever 6 is not displaced.

The arm 62 has a substantially L shape in plan view, and a tip end 621 thereof that is bent into a hook in a direction opposite to the side opposing to the coil spring 7 (described later) is engaged with the coil spring 7. This arm 62 rotates the lever 6 around the central position of the opening 611 formed on the circular section 61 with the biasing force by the coil spring 7.

The arm 63 stops rotation of the optical disc 4 with rotation of the lever 6, and a broad contact section 631 contacting with the edge face of the optical disc 4 is formed on the tip end of the arm 63. The contact section 631 has a substantially C-shaped cross section, and a pad 8 made of silicon or the like is attached inside this substantially C-shaped portion for increasing friction with the edge face of the optical disc 4 (Refer to FIG. 6). The face opposing to an edge face of the optical disc 4 of this pad 8 is a contact face 632 contacting with the edge face of the optical disc 4.

The arm 63 forms a blunt angle with the arm 62, more specifically, at an angle of about 135 degrees. In addition, the arm 63 has a larger dimension in the extending direction than that of the arm 62. With this feature, in rotating the lever 6, even when a rotational angle of the lever 6 is small, the quantity of movement of the contact section 631 on the arm 63 can be increased.

Further, the lower face of the contact section 631 rotates sliding on a face of the optical disc housing section 20, so that contact area between the lever 6 and the optical disc housing section 20 can be enlarged by forming the contact section 631 larger. With this feature, non-uniformity in a surface precision of the optical disc housing section 20 is absorbed, increasing stability of the lever 6.

The projection 13B formed on the cover section 13 contacts the arm 64 when the cover section 13 is closed, and the arm 64 is formed between the arms 62, 63. Specifically, the arm 64 forms an acute angle with the arm 62, more specifically at an angle of about 60 degrees. Formed on this arm 64 is an extension 641 substantially orthogonal to the extending direction of the arm 64, extending toward the arm 63 side.

The tip end of the extension 641 is so inclined that the dimension in the thickness direction of the extension 641 becomes smaller as getting close to the tip end in the extending direction. In other words, the tip end of the extension 641 is so inclined that the dimension in the extending direction of the extension 641 increases from the upper side toward the lower side, namely, having a substantially triangular cross section (Refer to FIG. 6). The projection 13B formed on the cover section 13 contacts with the inclined face (a face 642) via the opening 20B when the cover section 13 is closed.

The stop mechanism of the optical disc 4 by the rotation stop mechanism 5 will be described below.

Figure 5:
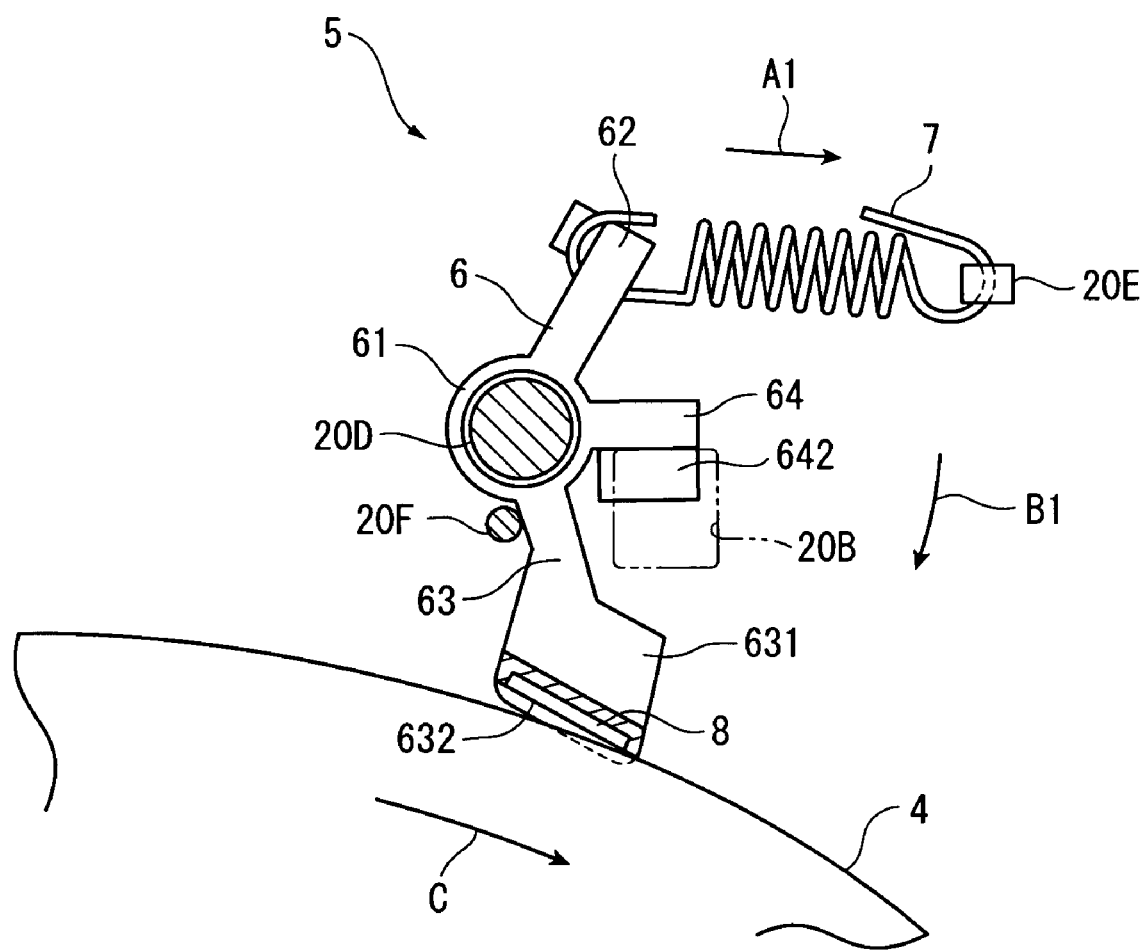
FIG. 5 is a view showing rotation of the lever in the embodiment with the cover section opened.
Figure 6:
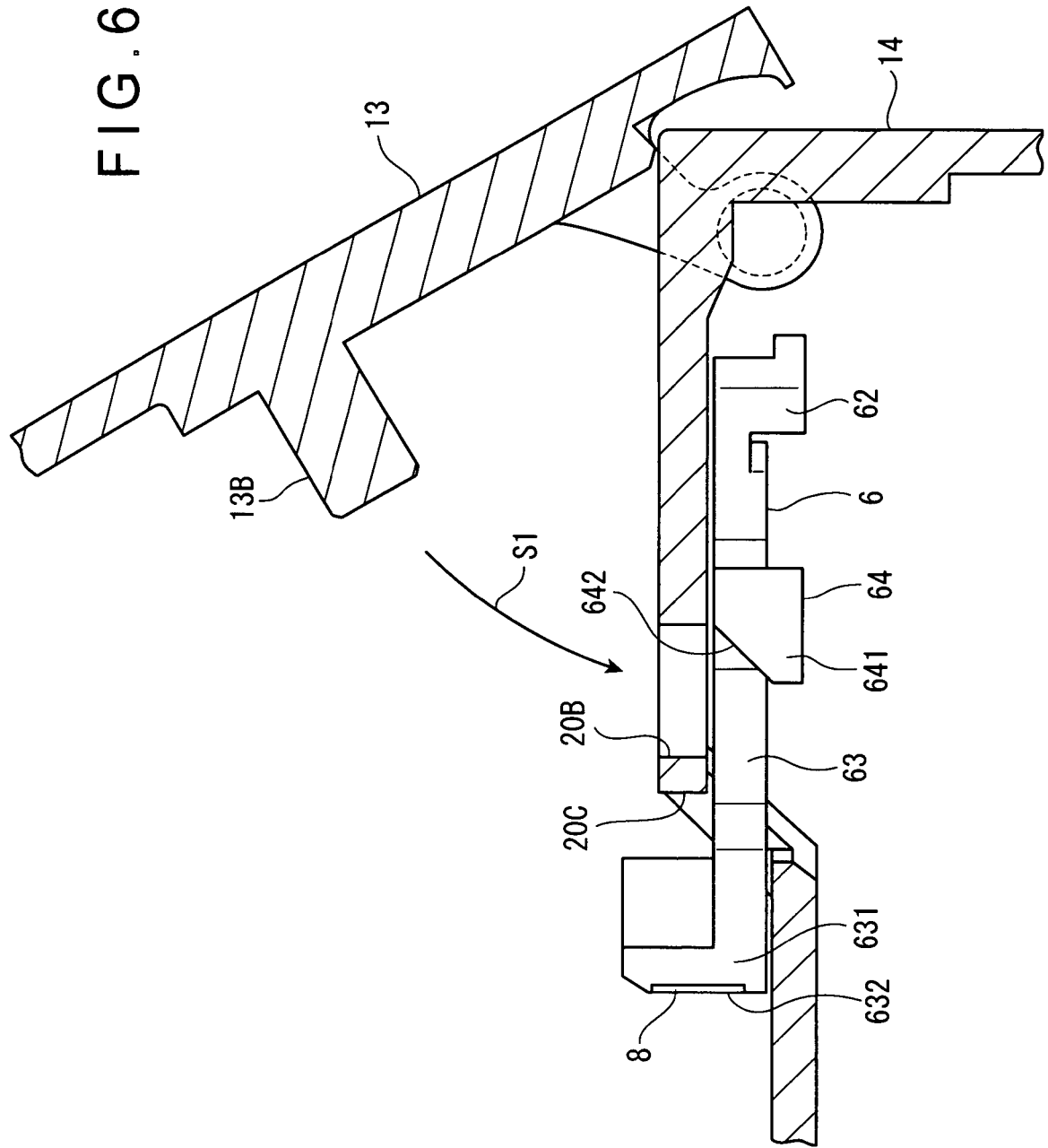
FIG. 6 is a view showing the cover section and the lever in the embodiment with the cover section opened.
Figure 7:
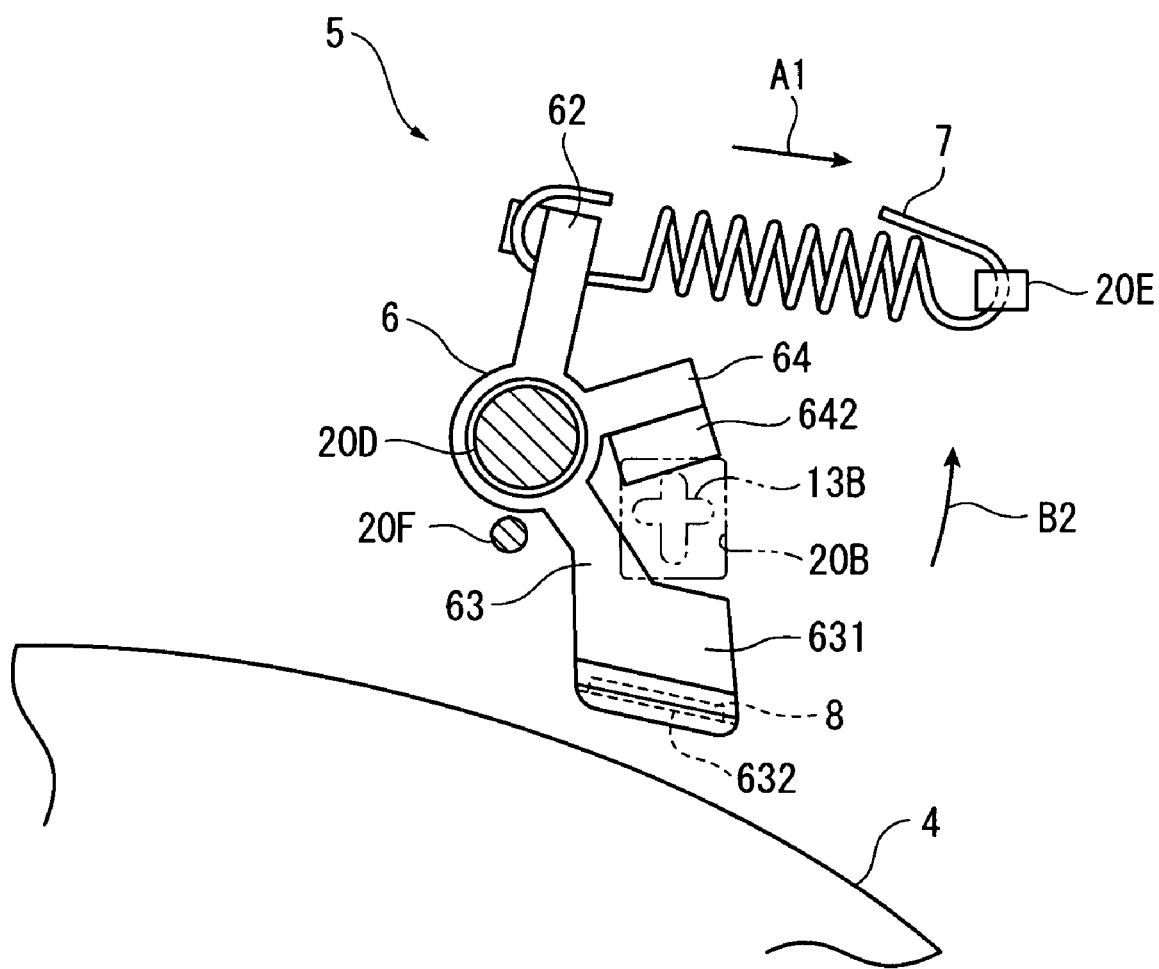
FIG. 7 is a view showing rotation of the lever in the embodiment with the cover section closed.

FIG. 5 shows rotation state of the lever 6 when the cover section 13 is opened. FIG. 6 shows a side view of the cover section 13 and the lever 6 when the cover section 13 is opened. FIG. 7 shows the rotation state of the lever 6 when the cover section 13 is closed.

As shown in FIG. 5, the lever 6 rotates around the center of the opening 611 on the circular section 61, namely, around the center of the projection 20D in the arrow B1 direction, as the arm 62 of the lever 6 is drawn in the arrow A1 direction in FIG. 5 with the biasing force of the coil spring 7, in the state where the cover section 13 is opened. With the rotation of the lever 6 in the arrow B1 direction, the contact face 632 of the arm 63 contacts with the edge face of the optical disc 4 housed in the optical disc housing section 20. Because of this feature, friction in rotation of the optical disc 4 increases, which stops the rotation of the optical disc 4.

The contact face 632 formed on the arm 63 is contacted inclining to the direction of the rotational tangent direction of the optical disc 4. More specifically, for the optical disc 4 rotating in the arrow C direction in FIG. 5, the contact face 632 opposing to an edge face of the optical disc 4 contacts with the edge face of the optical disc 4 such that the contact face 632 is opposed to the rotational direction of the optical disc 4. With such arrangement, even when there is slight non-uniformity in diameters of the rotating optical disc 4, at least some portion on the contact face 632 can contact with the optical disc 4. Therefore, rotation can be securely stopped even when one optical disc 4 used has a different diameter from another.

It is to be noted that a projection 20F projecting from the lower face of the upper case body 14 and the edge of the opening 20C (Refer to FIG. 3) are contacted with the arm 63 on the rotated lever 6, so that rotation range of the lever 6 is braked.

When the cover section 13 is closed, that is, when the cover section 13 rotates in the arrow S1 direction to be in the closed state as shown in FIG. 6, the projection 13B formed on the cover section 13 contacts with the face 642 formed on the arm 64 of the lever 6 via the opening 20B. The face 642 is so inclined that the dimension of the extension 641 in the extending direction becomes larger as getting closer to the lower side, thus the projection 13B contacts the face 642 deeper as the cover section is closed, and, as shown in FIG. 7, the lever 6 rotates in the arrow B2 direction in FIG. 7. This rotation of the lever 6 is against the biasing force of the coil spring 7 in the arrow A1 direction. With this feature, the contact face 632 on the contact section 631 moves away from the edge face of the optical disc 4, so that a braking operation to the optical disc 4 can be released.

As described above, the optical disc 4 rotates in the arrow C direction in FIG. 5, while the lever 6 rotates around the projection 20D in the arrow B1 direction to be pressed to the edge face of the optical disc 4 in braking the optical disc 4. Thus, when the optical disc 4 is braked, the lever 6 receives a force (force component) generated by the rotating optical disc 4 in a circumferential outward direction with the center of the optical disc 4 as an axis. The direction of the force (force component) is reverse to that of the arrow B1 direction in FIG. 5 and is the same as that of the arrow B2 direction in FIG. 7 in which the lever 6 rotates when the cover section 13 is closed. Thus, the lever 6 contacting with the edge face of the rotating optical disc 4 tries to rotate in the direction in which the lever 6 moves away from the edge face of the optical disc 4 with the acting force (force component) by the optical disc 4. However, with the biasing force generated by the coil spring 7, the lever 6 acting against the acting force (force component) remains to be in contact with the edge face of the optical disc 4. With this feature, when the optical disc 4 is braked, the force (force component) acting on the lever 6 due to rotation of the optical disc 4 can be controlled by the biasing force of the coil spring 7 rotating the lever 6 in the arrow B1 direction. Therefore, the contact face 632 on the lever 6 can be securely contact with the edge face of the optical disc 4 to brake the optical disc 4, and also a pressing force of the lever 6 to be contacted with the edge face of the optical disc 4 can be adjusted by controlling the biasing force of the coil spring 7.

There has been known a disc device based on the conventional technology in which a brake member for braking rotation of the optical disc 4 moves straight toward the center of the optical disc 4 to be pressed to the edge face of the optical disc 4 for stopping the rotation of the optical disc. However, the brake member as described above receives a force in the circumferential outward direction generated by the rotating optical disc 4, namely, a force in the direction different from that of movement of the brake member, so that the acting force (force component) or a posture of the brake member cannot be controlled in braking the optical disc 4, which results in jolting brake member.

Therefore, rotation of the optical disc 4 is controlled by the lever 6 rotating in the same direction as that of rotation of the optical disc 4, so that it is possible to control the acting force (force component) of the lever 6 by the coil spring 7, and also to suppress a jolt of the lever 6. In addition, the acting force (force component) described above can be controlled by the biasing force of the coil spring 7, so that arrangement of the rotation stop mechanism 5 can be simplified, With the first embodiment described above according to the present invention, the following advantages can be obtained.

(1-1) When the cover section 13 is opened, with the biasing force by the coil spring 7, the lever 6 rotates in the direction in which the contact section 631 formed on the arm 63 gets closer to the edge face of the optical disc 4, so that rotation of the optical disc 4 can be stopped by bringing the contact face 632 of the contact section 631 into contact with the edge face of the optical disc 4. In addition, when the cover section 13 is closed, the projection 13B formed on the cover section 13 contacts with the face 642 on the lever 6 via the opening 20B, so that the lever 6 rotates in the arrow B2 direction in Fig; 7 to move the pad 8 away from the edge face of the optical disc 4. With such arrangement, when the cover section 13 is opened, rotation of the rotating optical disc 4 can be stopped, while rotation of the optical disc 4 can not be impeded when the cover section 13 is closed.

Further, this rotation stop mechanism 5 rotates lever 6, brings contact face 632 of the lever 6 into contact with the edge face of the optical disc 4, and stops rotation of the optical disc 4. Thus, when the rotation stop mechanism 5 is formed, an angle adjustment for the contact face 632 contacting with the optical disc 4 can be easily carried out.

(1-2) The rotation stop mechanism 5 includes the lever 6, the coil spring 7, and the projection 13B formed on the cover section 13, and has an arrangement in which the projection 13B formed on the cover section 13 contacts with the face 642 inclining to the arm 64 of the lever 6, while the edge face of the optical disc 4 contacts with the contact face 632 of the lever 6. Therefore, rotation stop mechanism 5 can employ a simple arrangement for stopping rotation of the optical disc 4 in accordance with an open/close operation of the cover section 13.

(1-3) The rotation stop mechanism 5 has an arrangement in which the rotational direction C of the optical disc 4 coincides with the rotational direction B1 of the lever 6 rotated by the biasing force of the coil spring 7. With such arrangement, when rotation of the optical disc 4 is stopped, the lever 6 tries to rotate in the B2 direction with the acting force (force component) of the rotating optical disc 4, but the rotation of this lever 6 can be suppressed by the biasing force of the coil spring 7 which rotates the lever 6 in the B1 direction. Therefore, a pressing force of the lever 6 to the edge face of the optical disc 4 can be adjusted with the biasing force of the coil spring 7. Moreover, the acting force (force component) by the optical disc 4 acts as a force for rotating the lever 6 in a direction opposite to the contact direction to the optical disc 4, namely, a force for rotating the lever 6 in the direction moving away from the optical disc 4, so that the lever will not jolt. Thus an unnecessary load on the lever can be prevented.

(1-4) The contact face 632 formed on the arm 63 on the lever 6 is inclined to the direction of the rotational tangent direction of the optical disc 4 in such manner that the contact face 632 opposes the rotational direction of the optical disc 4. With this feature, even when there is a slight non-uniformity in diameters of the optical disc 4 housed in the optical disc housing section 20, at least some portion on the contact face 632 can contact with the edge face of the optical disc 4 due to the inclination of the contact face 632. Therefore, rotation of the optical disc 4 can be securely stopped even when one optical disc 4 used has an error in the radial direction compared to another.

Further, since the contact face 632 is inclined, if the contact section 631 is reduced in size, at least some portion on the contact face 632 can securely contact with the optical disc 4. Thus, size of the contact section 631 can be reduced, and the lever 6 and the rotation stop mechanism 5 can be downsized.

(1-5) The face 642 formed on the arm 64 on the lever 6 with which the projection 13B contacts when the cover section 13 is closed is inclined so that dimension of the extension 641 in the extending direction becomes larger as getting closer to the closing direction of the cover section 13. With this feature, when the cover section 13 is closed, the tip end of the projection 13B contacts with the face 642, and the lever 6 can be gradually rotated in the B2 direction against the biasing force of the coil spring 7 as the cover section 13 is closed. On the contrary, when the cover section 13 is opened, the lever 6 can be rotated along the inclination of the face 642 so that the lever 6 gradually gets closer to the edge face of the optical disc 4. With this feature, it is possible to prevent the lever 6 from suddenly rotating with the biasing force of the coil spring 7. Therefore, the contact face 632 formed on the lever 6 and the edge face of the optical disc 4 can contact with each other at a speed according to that for opening the cover section 13, and thus the brake operation for rotation of the optical disc 4 can be performed according to the state of opening the cover section 13.

2. Second Embodiment

Next, an entertainment device according to the second embodiment of the present invention will be described. The entertainment device according to the second embodiment has the substantially same arrangement as that of the entertainment device according to the first embodiment described above, except that a plate spring is employed as a biasing unit for the rotation stop mechanism. It is to be noted that, in the description below, the same reference numerals are assigned to the same sections as those already described above, and description thereof is omitted herefrom.

Figure 8:
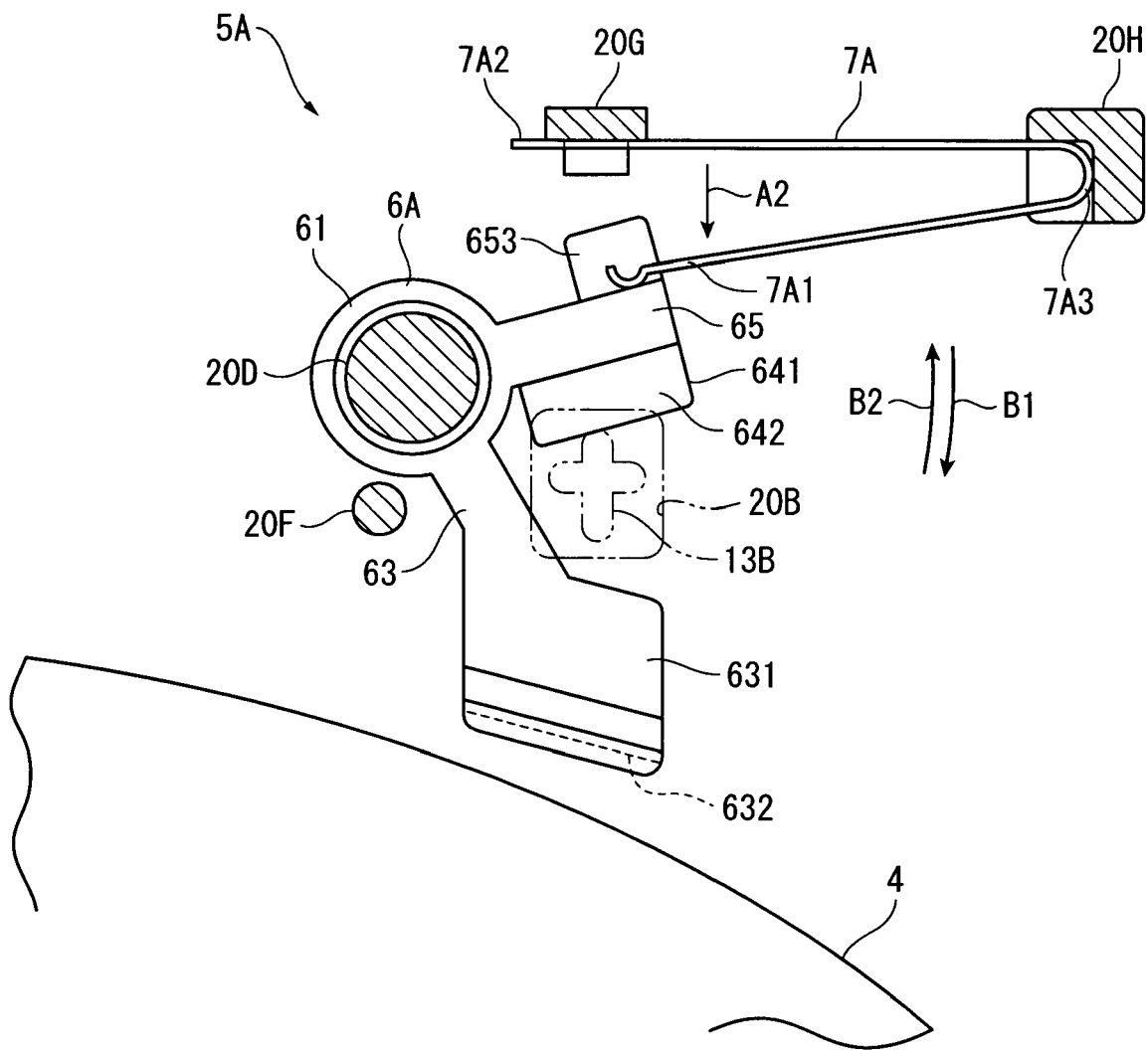
FIG. 8 is a view showing a rotation stop mechanism according to a second embodiment of the present invention with a cover section closed.

FIG. 8 shows a rotation stop mechanism 5A provided in the entertainment device 1 according to the second embodiment.

The rotation stop mechanism 5A includes, as shown in FIG. 8, a lever 6A, a plate spring 7A as the biasing unit, and the projection 13B formed on the cover section 13.

The lever 6A rotates, like the lever 6 described above, around the projection 20D in the direction getting closer to the edge face of the optical disc 4 when the cover section 13 is opened to stop the rotation of the optical disc 4. The lever 6A includes a circular section 61 and arms 63, 65 radially extending outward from the circular section 61. Namely, though described later in detail, the arm 63 having the contact section 631 is formed on one end of the lever 6A, while the arm 65 engaged with the plate spring 7A as the biasing unit is formed on the other end thereof, namely, on the end reached from this arm 63 via the circular section 61 as a rotation axis.

The arm 65 forms, like the arm 64, an acute angle with the arm 63 around the center of the circular section 61, more specifically at an angle of about 75 degrees, the extension 641 having a face 642 with which the projection 13B of the cover section 13 contacts is formed on the side opposing to the arm section 63. Further on the arm 65, formed on the side opposite to the side on which the an extension 641 is a presser 653 extending from the lower edge, namely, extending in out-of plane direction from the edge on the tip end in the direction for closing the cover section 13. One tip end of the plate spring 7A is placed between this presser 653 and the bottom face of the upper case body 14, and the face of the arm 65 with this presser 653 formed thereon contacts with the tip end of the plate spring 7A.

The plate spring 7A is has a substantially U-shape in plan view. A tip end 7A1 of the U-shape has a substantially C-shape in plan view, which contacts with the face of the arm 65 with the presser 653 formed thereon. Also, the face of the other tip end 7A2 opposite to the face opposing the tip end 7A1 contacts with the projection 20G projecting like a hook from the lower face of the upper case body 14 in an out-of plane direction. Further, a U-shaped arc section 7A3 contacts with a projecting section 20H projecting in a substantially L-shape cross section from the lower face of the upper case body 14.

The biasing force of the plate spring 7A in the arrow A2 direction in FIG. 8 is delivered via the arm 65 to the lever 6A to rotate the lever 6A in the arrow B1 direction. Along with this rotation, the contact section 631 formed on the arm 63 gets closer to the edge face of the optical disc 4, and the contact face 632 on the contact section 631 contacts with the edge face of the optical disc 4, so that the rotation of the optical disc 4 can be stopped.

When the cover section 13 is closed, the projection 13B formed on the cover section 13 contacts via the opening 20B with the face 642 on the arm 65, which rotates the lever 6A in the arrow B2 direction against the biasing force of the plate spring 7A in the arrow A2 direction, so that the contact face 632 on the lever 6A is moved away from the edge face of the optical disc 4, and thus the rotation of the optical disc 4 is not impeded.

With the entertainment device 1 according to the second embodiment as described above, even when the plate spring 7A as the biasing unit for the rotation stop mechanism 5A is employed, substantially the same advantages as those of (1-1) to (1-5) described in the first embodiment described above can be obtained, and moreover, the following advantages can be obtained.

The rotation stop mechanism 5 described in the first embodiment described above has an arrangement in which the coil spring 7 as the biasing unit engages with the arm 62, and makes the biasing force of the coil spring 7 act on the arm 62 to rotate the lever 6. On the other hand, the rotation stop mechanism 5A described in the second embodiment has an arrangement in which the biasing force of the plate spring 7A as the biasing unit acts on the arm 65 with which the projection 13B on the cover section 13 contacts rotate the lever 6A. Because of this feature, the arm 65 formed on the lever 6A also serves as the arm 62, 64 formed on the lever 6, so that the structure of the lever 6 can be simplified, and further, the lever 6 can be downsized.

3. Third Embodiment

Next, an entertainment device according to the third embodiment of the present invention will be described. The entertainment device according to the third embodiment has the substantially same arrangement as that of the entertainment devices according to the first and second embodiments described above, except that a torsion coil spring is employed as a biasing unit for the rotation stop mechanism.

The point of difference above will be described below in detail.

Figure 9:
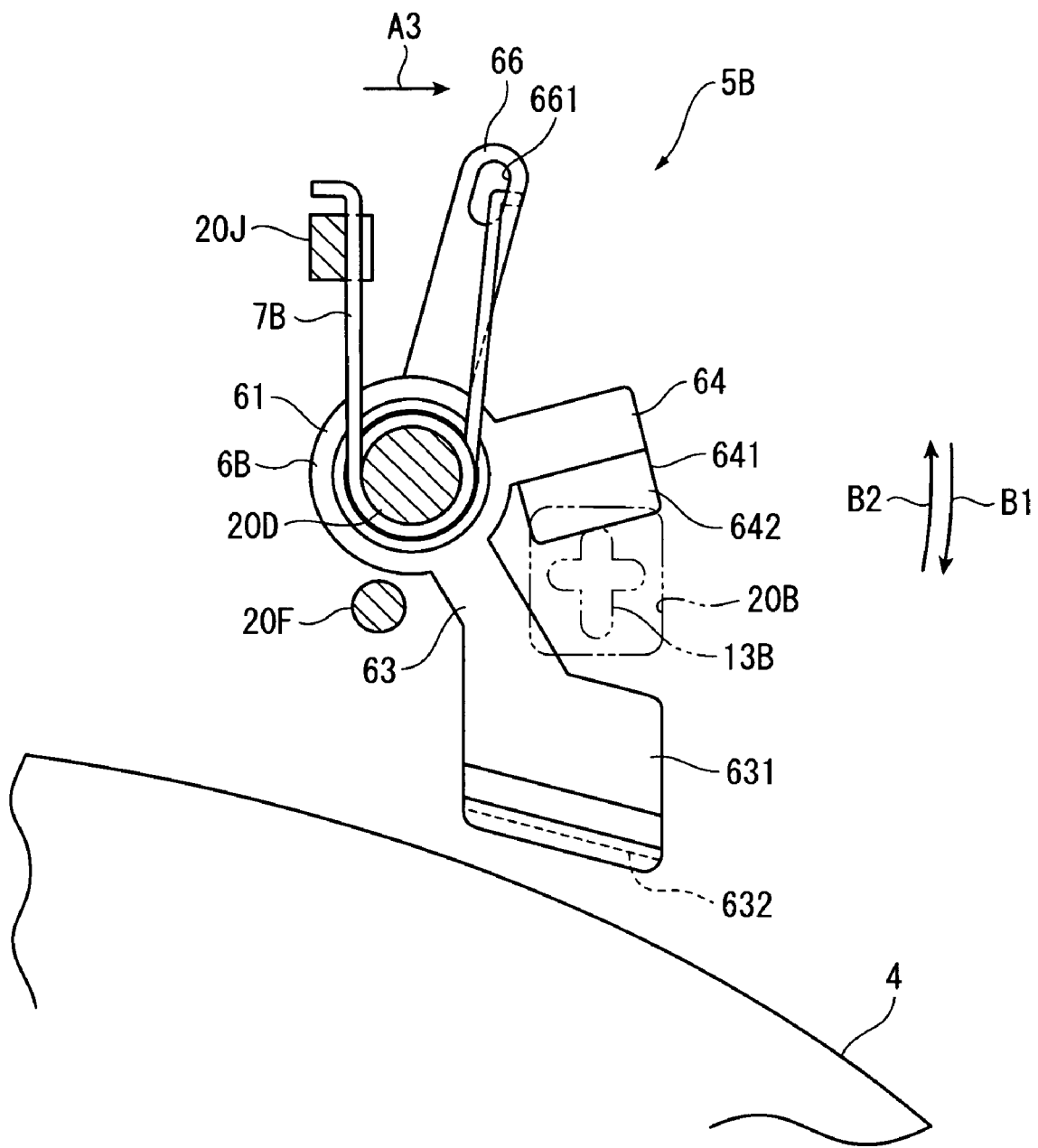
FIG. 9 is a view showing a rotation stop mechanism according to a third embodiment of the present invention with a cover section closed.

FIG. 9 shows a rotation stop mechanism 5B provided in the entertainment device 1 according to the third embodiment.

The rotation stop mechanism 5B includes, as shown in FIG. 9, a lever 6B, a torsion coil spring 7B as the biasing unit, and the projection 13B formed on the cover section 13.

The lever 6B is, like the lever 6 described above, rotatably supported on the projection 20D, the lever 6 rotating in the direction getting closer to the edge face of the optical disc 4 and contacting with the edge face when the cover section 13 is opened to stop the rotation of the optical disc 4. The lever 6B includes the circular section 61, and the arms 63, 64. Further, the lever 6B includes, unlike the lever 6, an arm 66 instead of the arm 62. Namely, though described later in detail, the arm 63 having the contact section 631 is formed on one end of the lever 6B, while the arm 66 engaged with the plate 7B as the biasing unit is formed on another end thereof, namely, on the end reached from this arm 63 via the circular section 61 as a rotational axis. The arm 64 is formed on still another end of the lever 6B namely, on the end located between these arms 63, 66 via the circular section 61.

The arm 66 radially extends from the circumferential edge of the circular section 61, engages with the torsion coil spring 7B and receives to the biasing force of the torsion coil spring 7B. This arm 66 forms, like the arm 62, a blunt angle with the arm 63 around the center of the circular section 61, more specifically at an angle of about 135 degrees, and at the same time, forms an acute angle with the arm 64, more specifically at an angle of about 60 degrees.

An oblong hole 661 is formed on the tip end of this arm 66 in the extending direction. The oblong hole 661 is a hole with which one end of the torsion coil spring 7B is engaged.

The torsion coil spring 7B has a substantially U-shape in plan view, which includes a coil section 7B3 wound in the shape of a coil at the center thereof and bend sections 7B1, 7B2 bent in the shape of a hook at both ends thereof. The projection 13B is inserted into the coil section 7B3. In addition, one bend section 7B1 engages with the oblong hole 661 formed on the arm on the lever 6B, while the other bend section 7B2 engages with a projection 20J projecting in the shape of a hook in an out-of plane direction from the lower face of the upper case body 14.

In the rotation stop mechanism 5B as described above, when the cover section 13 is opened, the lever 6B rotates in the arrow B1 direction with the biasing force of the torsion coil spring 7B in the arrow A3 direction in FIG. 9, and the contact face 632 on the contact section 631 formed on the arm 63 contacts with the edge face of the optical disc 4. With this feature, the rotation of the optical disc 4 can be stopped.

When the cover section 13 is closed, the projection 13B formed on the cover section 13 is contacts with the face 642 on the arm 64 formed on the lever 6B, which rotates the lever 6B in the arrow B2 direction against the biasing force of the torsion coil spring 7B. With this feature, the contact face 632 on the lever 6B is moved away from the edge face of the optical disc 4, so that the rotation of the optical disc 4 is not impeded.

With the entertainment device 1 according to the third embodiment as described above, even when the torsion coil spring 7B as the biasing unit for the rotation stop mechanism 5B is employed, substantially the same advantages as those of (1-1) to (1-5) described in the first embodiment described above can be obtained, and in addition, the following advantages can be obtained.

The rotation stop mechanism 5B includes the torsion coil spring 7B as the biasing unit, and this torsion coil spring 7B is attached to the projection 20D projecting from the lower face of the upper case body 14. With this feature, an area occupied by the rotation stop mechanism 5B in the upper case body 14 can be reduced. Therefore, the entertainment device 1 can be downsized, and internal space thereof can be effectively used to arrange the rotation stop mechanism 5.

4. Fourth Embodiment

An entertainment device according to the fourth embodiment of the present invention will be described. The entertainment device according to the fourth embodiment has the substantially same arrangement as that of the entertainment devices according to the first to third embodiments described above, except that a magnetic member is employed as a biasing unit for the rotation stop mechanism. The point of difference above will be described below in detail.

Figure 10:
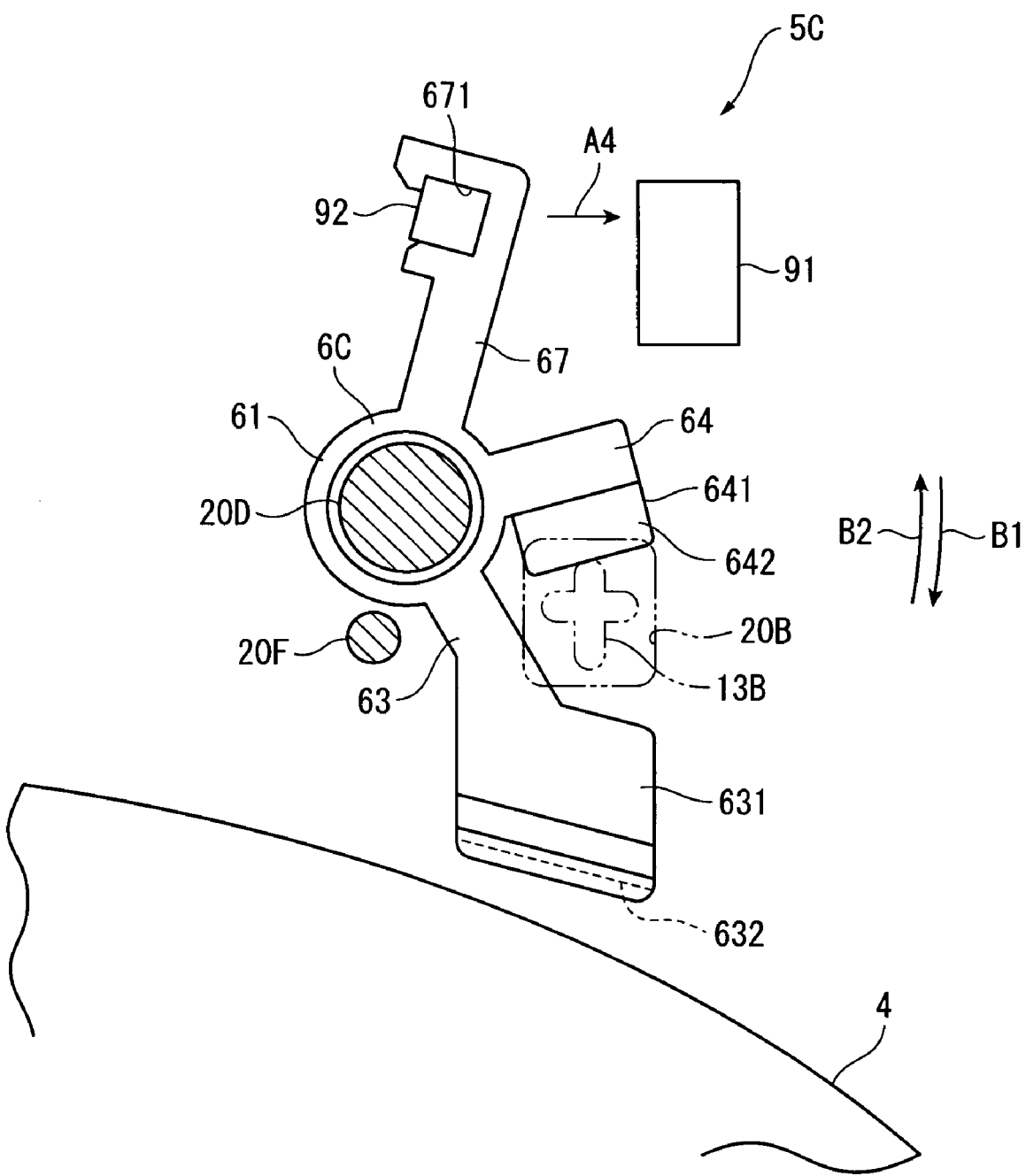
FIG. 10 is a view showing a rotation stop mechanism according to a fourth embodiment of the present invention with a cover section closed.

FIG. 10 shows a rotation stop mechanism 5C provided in the entertainment device 1 according to the fourth embodiment.

The rotation stop mechanism 5C includes, as shown in FIG. 10, a lever 6C rotatably attached to the projection 20D, a magnetic member 91 as the biasing unit provided on a side adjacent to the optical disc 4 and placed in a position away from the lever 6C, and the projection 13B formed on the cover section 13.

The lever 6C rotates, like the lever 6 described above, when the cover section 13 is opened, around the projection 20D in the direction getting closer to the edge face of the optical disc 4 to be contacted with the edge face for stopping the rotation of the optical disc 4. The lever 6C includes the circular section 61, and arms 63, 64, 67. Though described later in detail, the arm 63 having the contact section 631 is formed on one end of the lever 6C, while the arm 67 receiving the biasing force of the magnetic member 91 as the biasing unit is formed on another end thereof, namely, on the end reached from this arm 63 via the circular section 61 as a rotational axis. The arm 64 is formed on still another end of the lever 6C, namely, on the end located between these arms 63, 67 via the circular section 61.

The arm 67 radially extends from the circumferential edge of the circular section 61 on a position corresponding to that of the arm 62 on the lever 6 described above. Namely, the arm 67 forms an angle of about 135 degrees with the arm 63 and an angle of about 60 degrees with the arm 64, around the center position of the circular section 61.

Formed on the tip end of this arm 62 in the extending direction is a fitting section 671 having a substantially reversed C-shape in plan view, the fitting section 671 being engaged with a metal member 92 which is attracted by the magnetic member 91.

In the rotation stop mechanism 5C as described above, the magnetic member 91 attracts the metal member 92 attached to the arm 67 of the lever 6C, so that the lever 6C is biased in the arrow A4 direction in FIG. 10. Because of this feature, when the cover section 13 is opened, the lever 6C rotates in the arrow B1 direction with the biasing force of the magnetic member 91, and thus the contact face 632 formed on the arm 63 on the lever 6C contacts with the edge face of the optical disc 4, thereby allowing the rotation of the optical disc 4 to be stopped. When the cover section 13 is closed, the projection 13B formed on the cover section 13 contacts with the face 642 on the arm 64 formed on the lever 6C to rotate the lever 6C in the arrow B2 direction. With this feature, the contact face 632 is moved away from the edge face of the optical disc 4, so that the rotation of the optical disc 4 is not impeded by the lever 6C.

With the entertainment device 1 according to the fourth embodiment as described above, even when the magnetic member 91 as the biasing unit for the rotation stop mechanism 5C is employed, substantially the same advantages as those of (1-1) and (1-3) to (1-5) described in the first embodiment described above can be obtained, and moreover, the following advantages can be obtained.

The rotation stop mechanism 5C includes the lever 6C, the metal member 92 attached to this lever 6C, and the magnetic member 91 provided on the side adjacent to the optical disc 4 and placed in a position away from the lever 6C. With this feature, the arrangement of the rotation stop mechanism 5C for stopping rotation of the optical disc 4 when the cover section 13 is opened can be simplified.

Further, with the magnetic member 91, the arm 67 with the metal member 92 attached thereto is attracted to rotate the lever 6C. Thus, as the magnetic member 91 and the lever 6C get closer, the biasing force for rotating the lever 6C in the arrow B1 direction becomes larger. Because of this feature, in the state where the metal member 92 provided on the lever 6C and the magnetic member 91 are positioned closest to each other, namely, in the state where the contact face 632 on the lever 6C is in contact with the edge face of the optical disc 4, the biasing force of the magnetic member 91 to the lever 6C becomes the strongest. Thus, the contact face 632 on the lever 6C can strongly contact with the edge face of the optical disc 4, which enhances braking efficiency for stopping rotation of the optical disc 4, On the contrary, the biasing force acting on the lever 6C with the magnetic member 91 becomes smaller as the lever 6C moves away from the magnetic member 91. Because of this feature, in the state where the cover section 13 is closed, when the lever 6C rotates in the arrow B2 direction to be away from the edge face of the optical disc 4, the biasing force to the lever 6C becomes the smallest. In the entertainment device 1, since the cover section 13 is opened when the optical disc 4 is housed, or when the optical disc 4 is taken out, a frequency of the closed state of the cover section 13 is higher than that of the opened state. Therefore, a load to the lever 6C can be reduced in the closed state of the cover section 13 with high frequency, so that damages to the lever 6C can be prevented.

5. Fifth Embodiment

An entertainment device according to the fifth embodiment of the present invention will be described. The entertainment device according to the fifth embodiment has the substantially same arrangement as that of the entertainment device according to the second embodiment described above, except that, when a cover section is substantially fully opened, a hinge for moving a lever included in a rotation stop mechanism away from the edge face of the optical disc is provided.

The point of difference above will be described below in detail.

Figure 11:
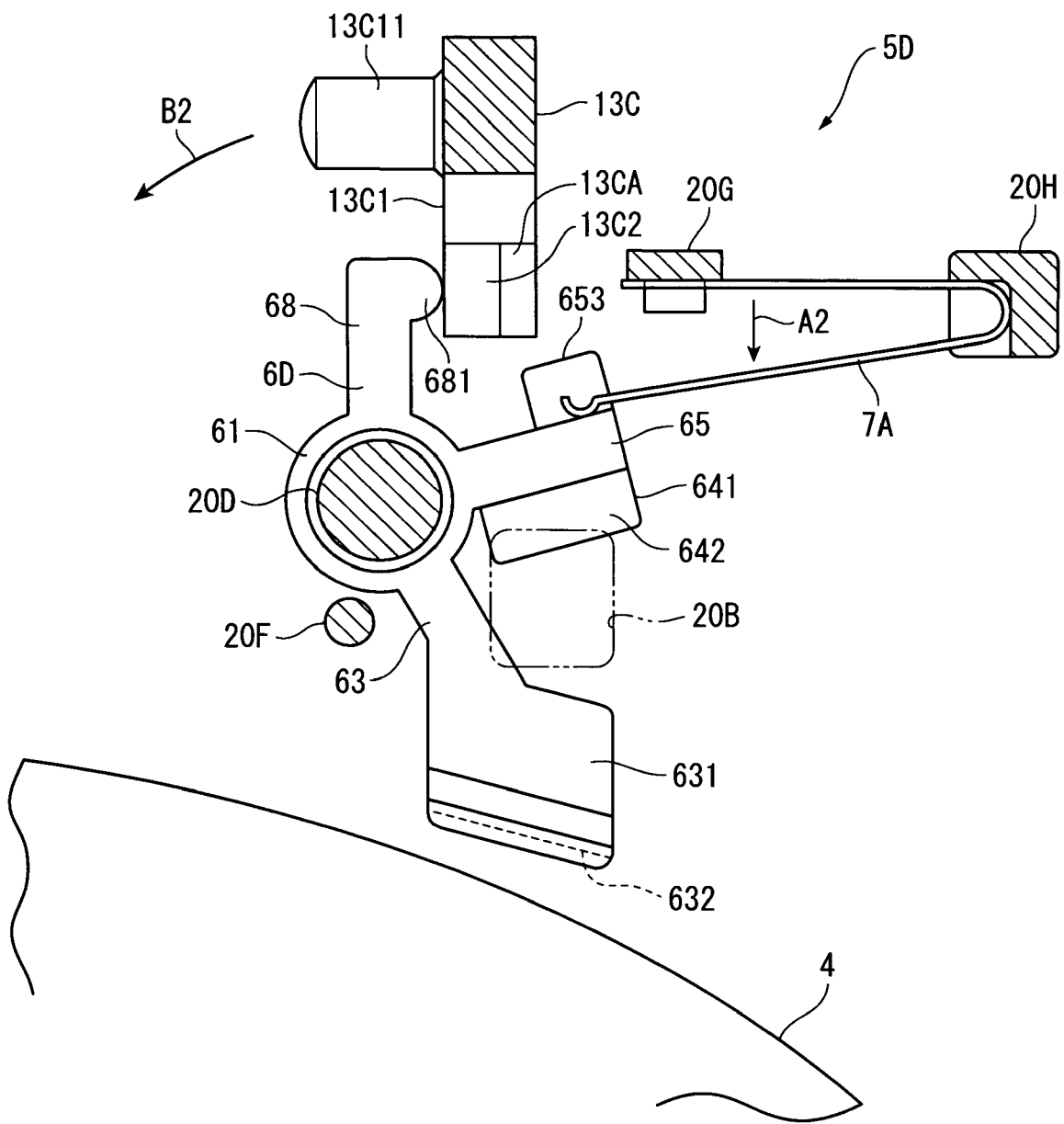
FIG. 11 is a view showing a rotation stop mechanism according to a fifth embodiment of the present invention with a cover section fully opened.

FIG. 11 shows a rotation stop mechanism 5D provided in the entertainment device 1 according to the fifth embodiment. More specifically, FIG. 11 shows the engagement state between the rotation stop mechanism 5D and a hinge 13C when the cover section 13 is substantially fully opened.

The rotation stop mechanism 5D includes a lever 6D rotatably supported on the projection 20D and contacting with the edge face of the optical disc 4, the plate spring 7A as the biasing unit for biasing this lever 6D in the direction for contacting with the optical disc 4, and the projection 13B (not shown in FIG. 11, refer to FIG. 14) formed on the cover section 13. Further, in the vicinity of the lever 6D, the hinge 13C formed on the cover section 13 for rotatably attaching the cover section 13 to the upper case body 14 is provided.

As with the lever 6A described above, the lever 6D is rotates when the cover section 13 is opened, in the direction getting close to the edge face of the optical disc 4 to contact the edge face of the optical disc 4 for stopping the rotation of the optical disc 4. The lever 6D includes, like the lever 6A, the circular section 61 for the projection 20D to be inserted therein, and the arms 63, 65. Further, on this lever 6D, an arm 68 is formed at an angle of about 135 degrees with the arm 63 and at an angle of about 60 degrees with the arm 65 around the center of the circular section 61. Namely, the arm 63 having the contact section 631 is formed on one end of the lever 6D, while the arm 65 engaged with the plate spring 7A as the biasing unit is formed on another end thereof, namely, on the end reached from this arm 63 via the circular section 61 as a rotational axis. The arm 68 is formed on still another end of the lever 6C, namely, on the end opposite to the arm 63 via the circular section 61.

Formed on the side of the tip end of the arm 68 facing to the arm 65 is a bulging section 681 having a substantially semi-circle cross section with the lower portion bulging in the hemispherical shape. The bulging section 681 contacts with the hinge 13C provided on the cover section 13 when the cover section 13 is opened.

Figure 12:
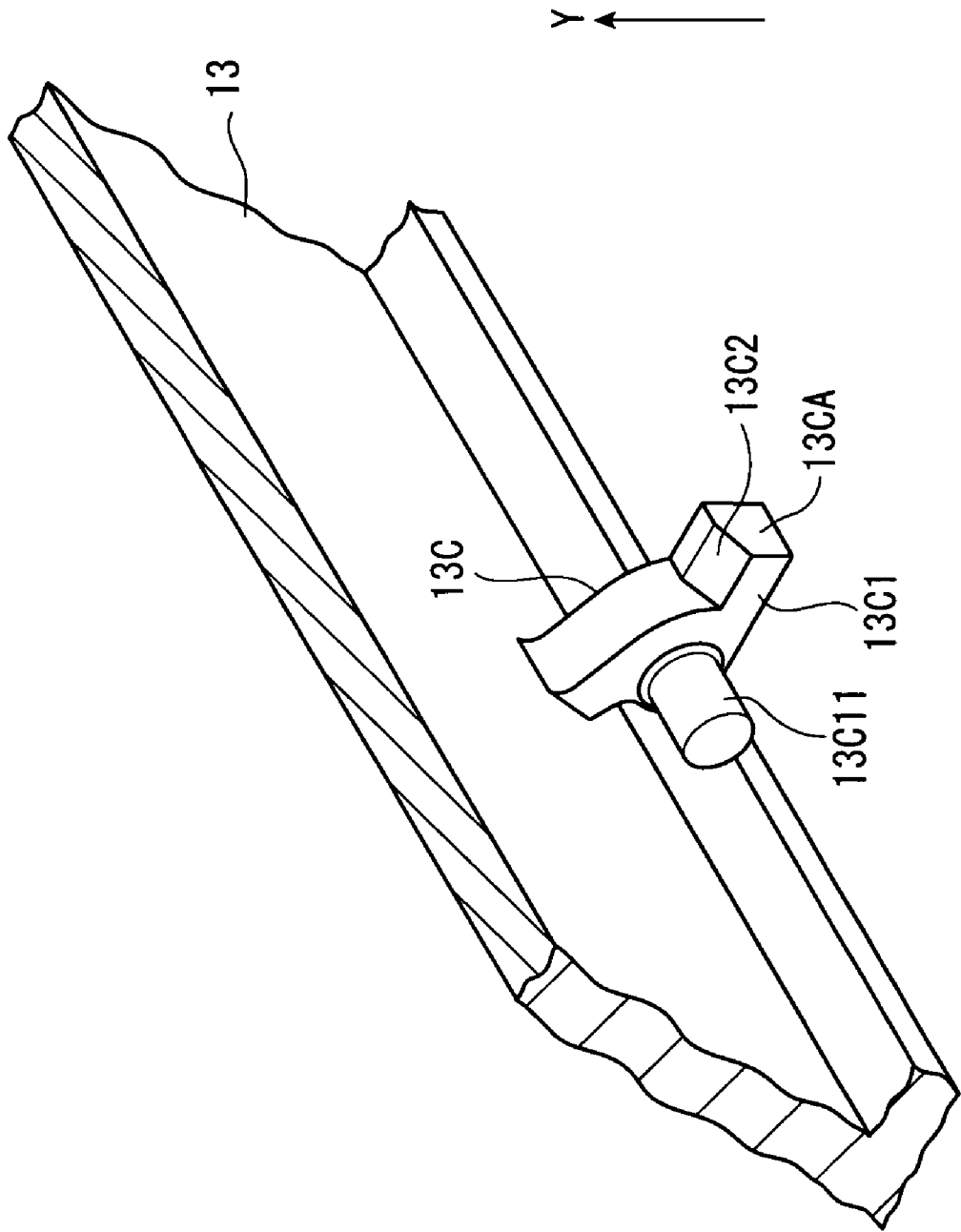
FIG. 12 is a view showing a hinge according to the embodiment.

FIG. 12 is a perspective view illustrating the hinge 13C provided on the cover section 13.

The hinge 13C rotatably attaches the cover section 13 to the upper case body 14, while functioning as a second release unit in which, when the cover section 13 is substantially fully opened, the hinge 13C rotates the lever 6D included in the rotation stop mechanism 5D to move the lever 6D away from the optical disc 4. As shown in FIGS. 11 and 12, the hinge 13C projects from a face of the cover section 13 opposing the optical disc housing section 20, namely, projecting from the lower face of the cover section 13 in an out-of-plane direction, the hinge 13C being formed in a substantially L-shape with the tip end bent in side view.

A substantially cylindrical shaft portion 13C11 projects in an out-of-plane direction from a face 13C1 on a side closer to the center of the optical disc housing section 20 in the hinge 13C, which engages with a concave section (not shown) provided in the upper case body 14 to rotatably attach the cover section 13 to the upper case body 14.

A tip end 13CA of the hinge 13C rotates around the shaft section 13C11 along with the rotation of the cover section 13. The upper face of the tip end 13CA, namely, a face 13C2 facing to the lower face of the cover section 13 is inclined so that dimension of the tip end 13CA in the height direction (Y-axis direction in FIG. 12) becomes larger as getting closer to a face opposite to the face 13C1. When the cover section 13 is opened, the bulging section 681 formed on the lever 6D contacts with the face 13C2.

The engagement state between the rotation stop mechanism 5D and the hinge 13C will be described below.

Figure 13:
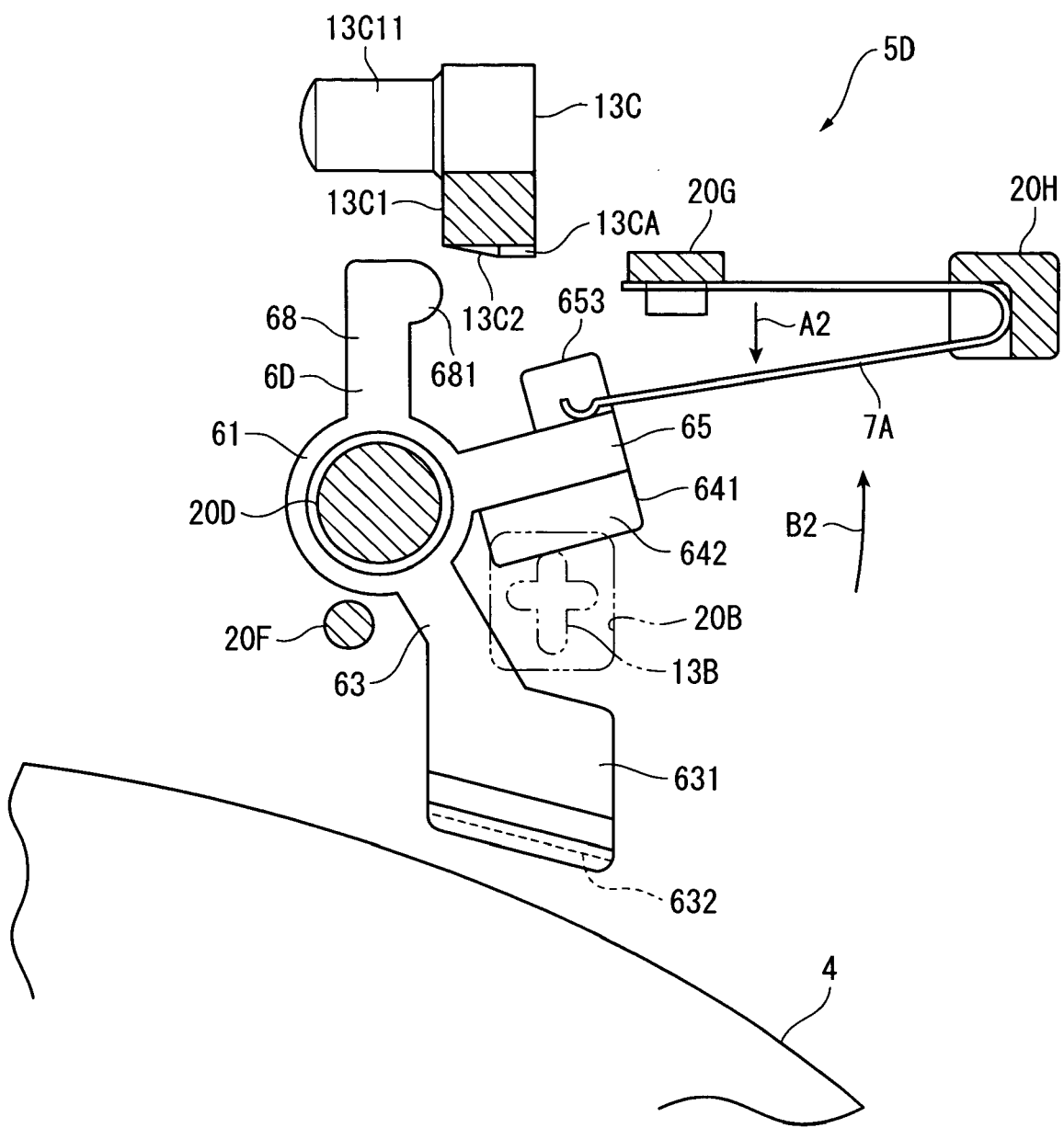
FIG. 13 is a view showing engagement between a lever and the hinge in the embodiment with the cover section closed.
Figure 14:
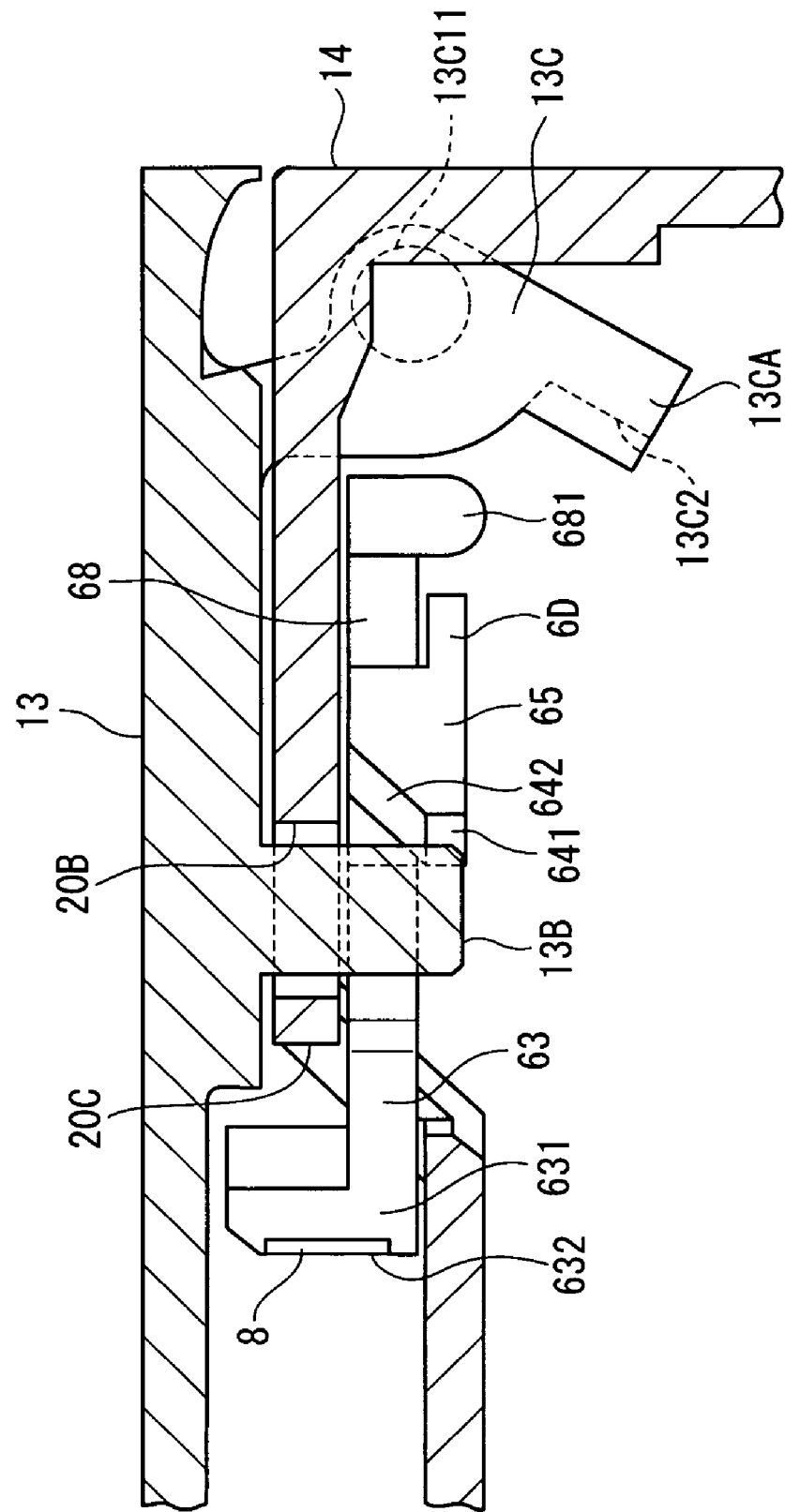
FIG. 14 is a side view showing the cover section and the lever in the embodiment with the cover section closed.
Figure 15:
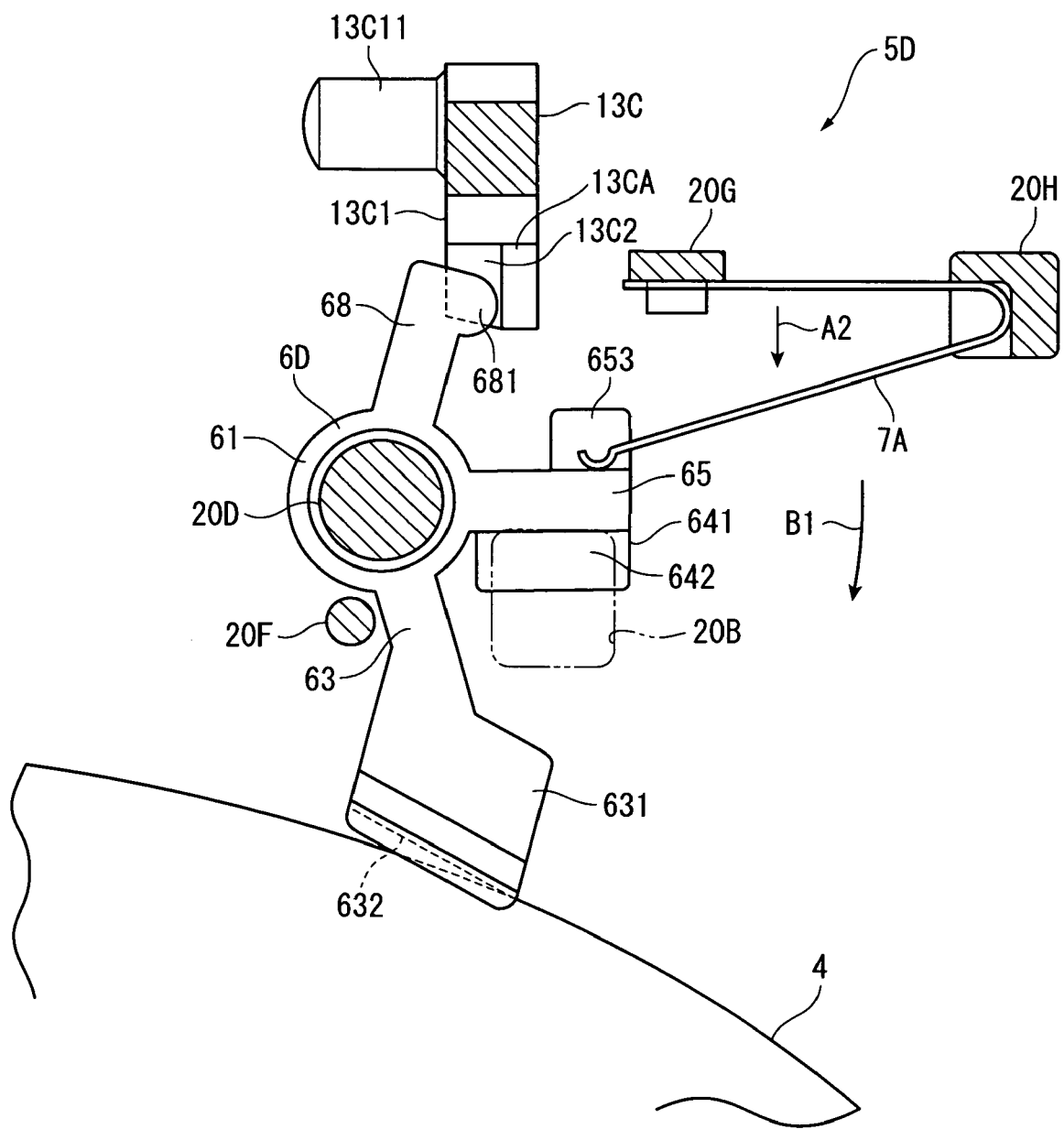
FIG. 15 is a view showing engagement between the lever and the hinge in the embodiment with the cover section half opened.

FIG. 13 shows the engagement state between the rotation stop mechanism 5D and the hinge 13C when the cover section 13 is closed, and FIG. 14 shows a side view of the cover section 13 and the lever 6D in the state described above. FIG. 15 shows the engagement state between the lever 6D and the hinge 13C when the cover section 13 is half opened, and FIG. 16 shows a side view of the cover section 13 and the lever 6D in the state described above.

When the cover section 13 is closed, as shown in FIGS. 13 14, the projection 13B formed on the cover section 13 contacts with the face 642 formed on the arm 65 of the lever 6D. At this time, as the hinge 13C is positioned below the lever 6D in the casing 10, the bulging section 681 formed on the arm 68 of the lever 6D does not contact with the face 13C2 of the hinge 13C. In this state, the projection 13B of the cover section 13 rotates the lever 6D in the arrow B2 direction in FIG. 13 along the inclination of the face 642. This rotation is performed against the biasing force of the plate spring 7A as the biasing unit in the arrow A2 direction in FIG. 13. Because of this feature, when the cover section 13 is closed, the lever 6D moves away from the edge face of the optical disc 4, so that the rotation of the optical disc 4 is not impeded by the lever 6D.

When the cover section 13 is slightly opened, namely, when the cover section 13 is half opened, as shown in FIGS. 15 and 16, engagement between the projection 13B on the cover section 13 and the face 642 formed on the arm 65 of the lever 6D is released, and the lever 6D rotates in the arrow B1 direction by the biasing force of the plate spring 7A in the arrow A2 direction in FIG. 15. With this feature, the contact face 632 formed on the arm 63 of the lever 6D contacts with the edge face of the optical disc 4 to stop the rotation of the optical disc 4.

In this step, as shown in FIG. 16, along with the opening operation of the cover section 13, the hinge 13C integrally formed with the cover section 13 rotates around the shaft section 13C11, so that the hinge 13C and the bulging section 681 formed on the arm 68 of the lever 6D get closer, bringing the face 13C2 formed on the tip end 13CA of the hinge 13C into contact with the bulging section 681.

When the cover section 13 is further opened from the half-opened state, namely, when the cover section 13 is rotated in the arrow S2 direction in FIG. 16, the tip end 13CA of the hinge 13C also rotates around the shaft section 13C11 in the arrow S2 direction. At this time, the bulging section 681 formed on the lever 6D moves, as shown in FIG. 11, along the inclination of the face 13C2 formed on the hinge 13C toward the face 13C1 side, namely, in the arrow B2 direction in FIG. 11. Therefore, when the cover section 13 is substantially fully opened, the bulging section 681 moves along the inclination of the face 13C2 of the hinge 13 toward the face 13C1 side substantially hanging from the edge face of the face 13C2, so that the lever 6D rotates in the arrow B2 direction against the biasing force by the plate spring 7A in the arrow A2 direction. Along with this rotation, the contact face 632 of the lever 6D moves away from the edge face of the optical disc 4.

With the entertainment device 1 according to the fifth embodiment as described above, substantially the same advantages as those described in the second embodiment described above can be obtained, and moreover, the following advantages can be obtained.

Namely, when the cover section 13 is half opened, the contact face 632 on the lever 6D can contact with the edge face of the optical disc 4 due to the biasing force of the plate spring, so that while the state of the cover section 13 shifts from closed to opened, the rotation of the optical disc 4 can be stopped. In addition, when the cover section 13 is half opened, the bulging section 681 formed on the lever 6D and the face 13C2 of the hinge 13C formed on the cover section 13 contact with each other. When the cover section 13 is shifted from the half-opened state to the substantially fully-opened state, since the face 13C2 of the hinge 13C is inclined, the bulging section 681 on the lever 6D in contact with the face 13C2 moves in the arrow B2 direction. Along with the movement of the bulging section 681, the lever 6D rotates in the arrow B2 direction, so that the contact face 632 on the lever 6D can be moved away from the edge face of the optical disc 4. Thus, when the cover section 13 is substantially fully opened, engagement between the lever 6D and the optical disc 4 is released, so that the optical disc 4 can be easily taken out from the optical disc housing section 20 in the substantially fully opened state.

Further, engagement between the cover section 13 and a hooking member is released in response to pressing the open/close button 16, so that the cover section 13 is opened with the biasing force by the coil spring 17. At this time, the biasing force of the coil spring 17 used for opening the cover section 13 is also used as a rotational force for rotating the lever 6D in the arrow B2 direction against the biasing force of the plate spring 7A. With this feature, as the cover section 13 is closer to the fully-opened state, the biasing force of the coil spring 17 is used as the rotational force for the lever 6D, so that the cover section 13 can be opened gradually.

6. Modification of Embodiments

It is to be noted that the present invention is not limited to the embodiments described above, but various modifications and improvements within the range in which the object of the present invention can be achieved are included in the present invention.

In each of the embodiments described above, the levers 6, 6A, 6B, 6C, 6D each includes a plurality of arms, each of the arms engaging with the biasing unit, contacting with the projection 13B on the cover section 13, or contacting with the edge face of the optical disc 4, but the present invention is not limited thereto. Instead, one arm extending from the circular section 61 may be engaging with the biasing unit, contacting with the projection 13B, and contacting with the edge face of the optical disc 4. The lever may be formed in the plate-like form, not having an arm extending from the circular section 61. That is, the lever according to the present invention is not limited to the levers 6, 6A, 6B, 6C, 6D described above.

In each of the embodiments described above, the face 642 on the levers 6, 6A, 6B, 6C, 6D with which the projection 13B contacts is inclined, however, the tip side of the projection 13B may be alternatively inclined.

In each of the embodiments described above, the rotational direction of the optical disc 4 is the arrow C direction shown in FIG. 5, and the rotational direction of the levers 6, 6A, 6B, 6C, 6D when contacting with the optical disc 4 is the same as that of the optical disc 4, but the present invention is not limited thereto. The rotational direction of the optical disc 4 may be reverse to that of the levers when contacting with the optical disc 4. In this case, when the lever contacts with the optical disc 4, the lever contacts with the optical disc 4 in such manner that the optical disc 4 is caught up by the lever, and thus the rotation of the optical disc can be stopped quickly. It is to be noted that in a case where the rotational direction of the lever is reverse to that of the optical disc, the lever described above should be turned over, and a biasing unit such as a coil spring or the like is attached thereto, so that the lever is biased in the direction for contacting the optical disc.

In each of the embodiments described above, each of the rotation stop mechanisms 5, 5A, 5B, 5C, 5D is set in the far side on the right side of the optical disc housing section 20 in FIG. 2, but the present invention is not limited to this setting position. For instance, the rotation stop mechanism may be set in the far side on the left side of the optical disc housing section 20. In this case, just like the case where the rotational direction of the optical disc 4 is reverse to that of the lever as described above, the lever should be turned over, and a biasing unit such as a coil spring or the like is attached thereto, so that the lever is biased in the direction for contacting the optical disc.

In the first to third and fifth embodiments, the coil spring 7, the plate spring 7A and the torsion coil spring 7B are employed as the biasing unit for the rotation stop mechanisms 5, 5A, 5B respectively, but the present invention is not limited thereto, and other types of spring may be used. For instance, the projection 20D on which the levers 6, 6A, 6B, 6C, 6D are supported can be a torsion bar spring. In this case, further space for the rotation stop mechanism 5D can be saved.

In the rotation stop mechanism 5D according to the fifth embodiment, the plate spring 7A is employed as the biasing unit, but other types of spring may be used, or the magnetic member 91 may be used.

In the fourth embodiment described above has a arrangement in which the magnetic member 91 is used as then biasing unit for the rotation stop mechanism 5C, the magnetic member 91 is placed in a position away from the lever 6C, and the metal member 92 attracted by the magnetic member 91 is provided on the lever 6C, but the arrangement in which the magnetic member 91 may be provided on the lever 6C is applicable. Further, instead of the arrangement in which the metal member 92 is attracted by the magnetic member 91, the arrangement in which two magnetic members repelling to each other may be provided on the upper case body 14 and the lever respectively.

In the fifth embodiment, the hinge 13C rotatably attaching the cover section 13 to the upper case body 14 moves the lever 6D away from the optical disc 4 along with an opening operation of the cover section 13, but such mechanism is not be limited to the hinge. Instead, the projecting section projecting from the lower face of the cover section 13 may be used.

Each of the embodiments described above has a arrangement in which the entertainment device 1 can not only read information recorded in the optical disc 4, but also record information depending on the optical disc 4 used, however, the entertainment device 1 capable of executing at least either reading or recording information can be applied to the present invention.

Each of the embodiments described above employs the optical disc 4 as a disc for use in the present invention, but a magnetic disc may be used. Namely, any type of disc can be applied to the present invention as long as the disc can read and/or record recorded information and as long as the disc is rotated with a driving unit during reading/recording.

INDUSTRIAL APPLICABILITY

The present invention is applicable to a disc device that reproduces information recorded on a disc such as an optical disc (CD, DVD, etc.), a magnetic optical disc and a magnetic disc and/or records information on the disc, the disc device including a casing that includes: a casing body having a housing section in which the disc is set; and a cover section for covering an opening for housing the disc in the housing section.

The invention claimed is:

1. A disc device, comprising a casing including: a casing body that has a housing section for housing a disc therein and houses a device body including a drive unit for rotating the disc; and a cover section rotatably supported on the casing body for closing an opening for housing the disc in the housing section,
    wherein a rotation stop mechanism is provided in the casing for stopping rotation of the disc when the cover section is opened,
    the rotation stop mechanism includes: a lever rotatably supported on the casing body and having a contact section contacting with an edge face of the disc set therein when the cover section is opened; a biasing unit provided on the lever for biasing the contact section in a direction toward the edge face of the disc; and a first releasing unit provided in a protruding state on the cover section, the first releasing unit contacting with the lever to rotate the lever in a direction away from the edge face of the disc when the cover section is closed for releasing contact between the contact section and the edge face of the disc, and
    the contact section has a contact face extending in a direction inclined against a rotational tangent direction of the disc.

2. The disc device according to claim 1, wherein the lever rotates in the same direction as that of the disc, and the contact section contacts with the edge face of the disc.

3. The disc device according to claim 1, wherein the biasing unit is a spring member attached to the casing body.

4. The disc device according to claim 1, wherein the biasing unit is a magnetic member attracting or repelling the lever with magnetism.

5. The disc device according to claim 1, wherein the lever has an inclined face with which the first releasing unit contacts, the inclined face inclined against a direction in which the first releasing unit advances and retracts.

6. The disc device according to claim 1, wherein the cover section is provided with a second releasing unit that contacts with the lever to rotate the lever in the direction away from the edge face of the disc when the cover section is substantially fully opened.

* * * * *